United States Patent
Ledbetter et al.

(10) Patent No.: US 7,630,193 B2
(45) Date of Patent: Dec. 8, 2009

(54) MULTIPLE POSITION COMPUTER DISPLAY ARM

(75) Inventors: Carl J. Ledbetter, Mercer Island, WA (US); Adrian M. Chandley, Sammamish, WA (US); Tarek Z. Elabbady, Redmond, WA (US); Steven T. Kaneko, Medina, WA (US); Aditha M. Adams, Seattle, WA (US); Fabrice Herpain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 11/223,614

(22) Filed: Sep. 9, 2005

(65) Prior Publication Data

US 2007/0058329 A1 Mar. 15, 2007

(51) Int. Cl.
*G06F 1/16* (2006.01)
(52) U.S. Cl. .............................. 361/679.21; 361/679.6
(58) Field of Classification Search ......... 361/679–683; 312/223.1, 223.2; 248/917–923
See application file for complete search history.

(56) References Cited

U.S. PATENT DOCUMENTS

| | | | | |
|---|---|---|---|---|
| 4,848,179 | A * | 7/1989 | Ubhayakar | 74/490.04 |
| 4,993,068 | A * | 2/1991 | Piosenka et al. | 713/186 |
| 5,206,790 | A * | 4/1993 | Thomas et al. | 361/681 |
| 5,765,797 | A * | 6/1998 | Greene et al. | 248/398 |
| 6,288,891 | B1 * | 9/2001 | Hasegawa et al. | 361/681 |
| 6,430,037 | B1 * | 8/2002 | Oba et al. | 361/680 |
| 6,654,234 | B2 * | 11/2003 | Landry et al. | 361/681 |
| 6,657,853 | B2 * | 12/2003 | Oba et al. | 361/681 |
| 6,826,043 | B2 * | 11/2004 | Chang | 361/683 |
| 6,870,730 | B2 * | 3/2005 | Riddiford | 361/681 |
| 6,912,121 | B2 * | 6/2005 | Karidis et al. | 361/681 |
| 6,972,944 | B2 * | 12/2005 | Clapper | 361/679 |
| 7,042,712 | B2 * | 5/2006 | Ghosh et al. | 361/680 |
| 7,061,753 | B2 * | 6/2006 | Michoux et al. | 361/681 |
| 7,206,196 | B2 * | 4/2007 | Ghosh et al. | 361/683 |
| 7,277,275 | B2 * | 10/2007 | Won et al. | 361/681 |
| D558,201 | S * | 12/2007 | Park et al. | D14/375 |
| 2002/0172001 | A1 * | 11/2002 | Homer et al. | 361/683 |
| 2004/0114315 | A1 * | 6/2004 | Anlauff | 361/681 |
| 2004/0156170 | A1 * | 8/2004 | Mager et al. | 361/683 |
| 2005/0036281 | A1 * | 2/2005 | Duncan | 361/683 |
| 2005/0057892 | A1 * | 3/2005 | Ghosh et al. | 361/680 |
| 2005/0057893 | A1 * | 3/2005 | Homer et al. | 361/683 |
| 2006/0077622 | A1 * | 4/2006 | Keely et al. | 361/681 |

(Continued)

*Primary Examiner*—Jayprakash N Gandhi
*Assistant Examiner*—Anthony Q Edwards
(74) *Attorney, Agent, or Firm*—Workman Nydegger

(57) ABSTRACT

Described is a computer display arm that couples a monitor to a base in a manner facilitates display monitor movement between various positions, including preset positions that may be generally optimized to match typical computer usage modes. In one implementation, an arm, which may be an articulating arm, includes or is otherwise associated with a mechanism that guides the user, if desired, to convenient stopping positions for different types of interaction. For example, preset stopping positions may be provided for conventional (e.g., mouse and keyboard) workstation-like interaction, video (e.g., DVD movie) playback, stand-up (walk-up) touch-screen interaction, and/or for pen input, similar to a tablet computing device. Users are able to position the monitor display screen between the preset positions if desired, and also may vary the positioning at the preset and/or other stopping points, to an extent. Software such as user interface code can change to match the current position.

17 Claims, 24 Drawing Sheets

U.S. PATENT DOCUMENTS

2006/0159077 A1* 7/2006 Vanecek .................... 370/360
2006/0173805 A1* 8/2006 Clifford et al. ................ 707/1
2006/0187626 A1* 8/2006 Ditzik ........................ 361/681
2006/0256512 A1* 11/2006 Esther Kang ............... 361/681

* cited by examiner

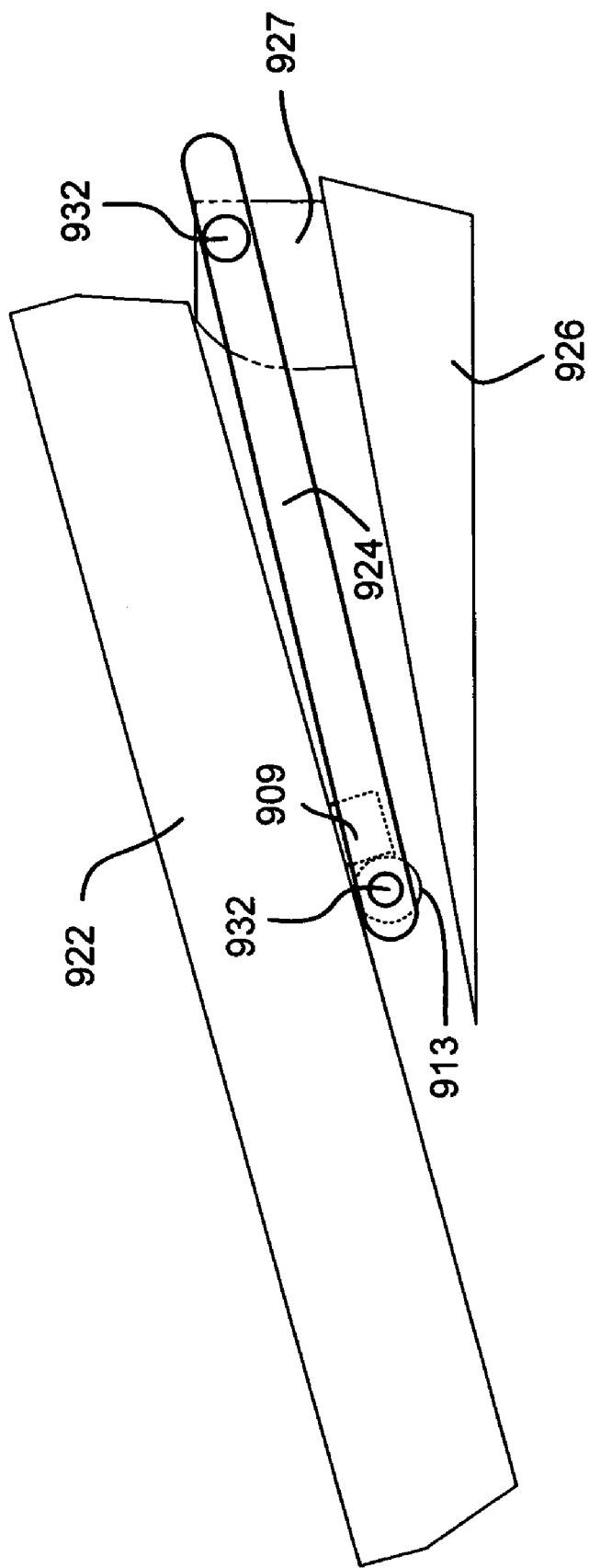

ns a computer monitor into one example usage mode.
MULTIPLE POSITION COMPUTER DISPLAY ARM

BACKGROUND

Computer users interact with computer systems in various ways and for various purposes. One way users interact is visually, through a display monitor. At present, the display monitor screens of many computer systems are frequently positioned at approximately a two-foot operating distance from the user's face.

While display monitors are sometimes adjustable in height, and generally provide a limited tilt/viewing angle, they do not offer flexibility for usage beyond traditional viewing posture and angles. For example, in addition to displaying visible output, many contemporary display monitors are configured for touch and/or pen input via an LCD digitizer screen. However, standalone display monitors (and even those physically coupled to a desktop computer or laptop computer) are typically positioned for workstation-like interaction, and, for example, are not capable of being readily positioned for touch and/or pen input.

SUMMARY

Briefly, various aspects of the present invention are directed towards a computer display arm that couples a monitor to a base in a manner facilitates display monitor movement between various positions, may include preset positions that may be generally optimized to match typical computer usage modes. In one implementation, an arm, which may be an articulating arm, includes or is otherwise associated with a mechanism that guides the user, if desired, to convenient stopping positions for different types of interaction. For example, preset stopping positions may be provided for conventional (e.g., mouse and keyboard) workstation-like interaction, video (e.g., DVD movie) playback, stand-up (walk-up) touch-screen interaction, and/or for pen input, similar to a tablet computing device. Users are able to position the monitor display screen between the preset positions if desired, and also may vary the positioning at the preset and/or other stopping points, to an extent.

The software that is currently loaded and executing on the computer system that is providing output to the display monitor, including the current user interface shell code, can be automatically changed to match the current display monitor position, including a preset position that corresponds to a current user interaction mode.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIGS. 9B and 9C are side view representations of a monitor using the mechanism of FIG. 9A for positioning a monitor between a substantially upright position and a substantially flat (e.g., tablet mode) position, respectively.

DETAILED DESCRIPTION

Various aspects of the technology described herein are directed towards a computer display arm that positions a computer display monitor among multiple positions, including preset positions that match typical usage modes. Various mechanical and electromechanical means are described as examples for implementing the present invention, and it will be readily appreciated that the examples herein are non-limiting. Further, computer monitors/displays are described herein as examples, however it is understood that any device capable of displaying visible output is equivalent. As such, any of the description set forth herein are non-limiting examples, and the present invention may be used various ways that provide benefits and advantages in computing and viewing in general.

Figure 1:
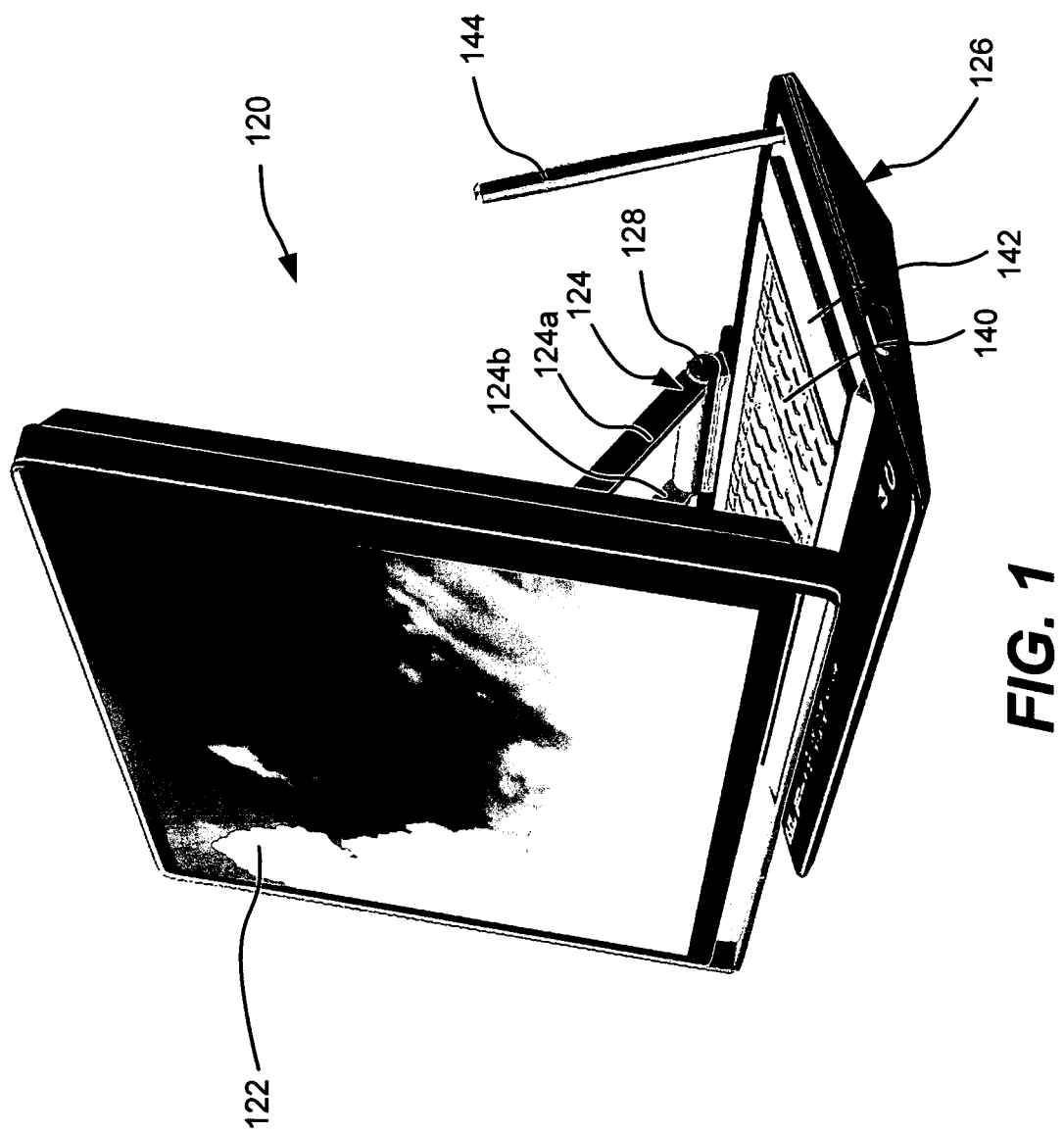
FIG. 1 shows an illustrative example of general-purpose computing system components including an arm that positions a computer monitor into one example usage mode.

Turning to FIG. 1 of the drawings, there is shown a perspective view of an example computer system 120. As represented in FIG. 1, a display monitor 122 is connected to a display arm 124 which is currently positioned such that the top of the display monitor 122 is tilted slightly back relative to the bottom of the display monitor 122. In this particular example, the display arm 124 comprises two arms 124a and 124b attached to the display monitor 122. Although not explicitly shown in FIG. 1, the arm's attachment to the display monitor 122 may be in virtually any practical way, typically one in which the monitor screen 122 may tilt at least to some extent relative to the arm angle.

A base 126 supports the display arm 124 in a manner that allows the display arm to pivot around an axis 128. The base 126 may include computer components such as a processor and memory, or some or all of such components may be provided elsewhere, including in the housing of the monitor 122. As will be understood, the arm 124 and its pivoting coupling (at least at one end) allows the monitor 122 to be positioned in a number of ways relative to the base 126. The positioning may be stabilized in virtually any way, including by friction, stops (e.g., detents), contact with the underlying surface (e.g., table or desk), braking, springs, counterweights and so forth, including any combination of these and other mechanisms.

Also represented in the example of FIG. 1 is a keyboard 140 and remote control device 142, shown in a retracted position. For example, a user may desire such positioning for viewing audiovisual content, and may control such operation by removing the remote control 142. In the event that the screen is touch and/or pen-sensitive, the user also may interact with the computer system via the display monitor 122 using a pen 142 or the like.

FIGS. 2-5 provide examples of typical usage modes for user interaction with a computer system, and in particular the computer system's display monitor. As will become readily apparent, a combination of hinge points and arm extensions designed to work together create a smooth movement of the display across a range of multiple positions. Some of the positions are preset, such as a mostly upright (productivity or workstation) position, a walk-up (touch screen) position, a forward (entertainment/media viewing) position, and a table level (pen interaction/tablet) position. Each preset position of the display may provide the user with one or more noticeable "stops" that are integrated into the hinge mechanism. When at a stop, additional tilt and the like may allow further fine-tuning within a range. Stops may be sensed in any way, such as physically and/or audibly sensed by a user or device, optically sensed, and/or may be controlled by motorized settings, and so forth. The stops aid in the ability of the user to maneuver the monitor into the optimized positions for viewing and/or touch/pen interaction. The arm mechanism may also provide smooth and intuitive movement for users as it transitions between the stops, and may allow for intermediate positions. Note that the display arm may be customized for a given monitor, or may provide for coupling to multiple sizes of monitors, such as relatively lightweight LCD flat panel displays.

Figure 2:
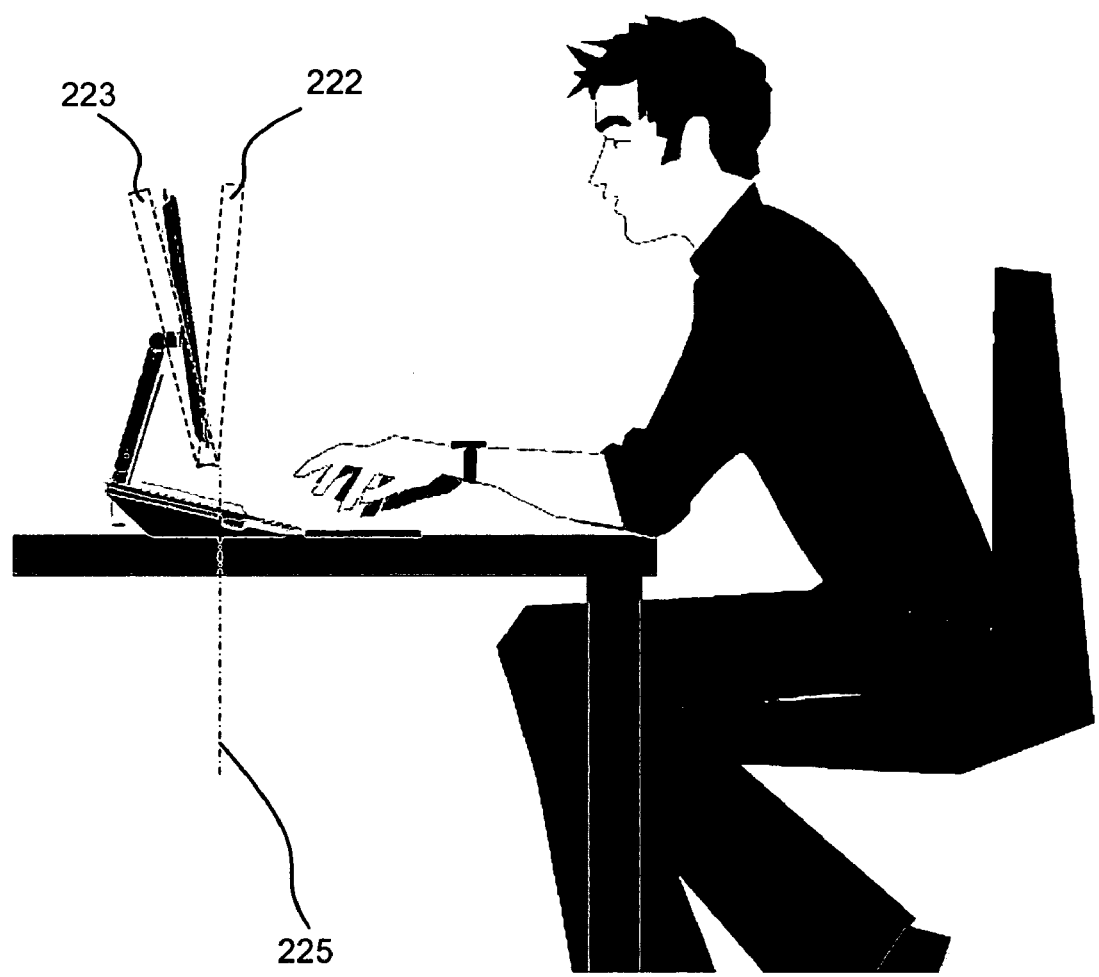
FIG. 2 is a representation of a workstation mode in which a monitor is substantially upright and positioned to provide access to input devices.

FIG. 2 provides an example of a workstation mode, such as in a position with the monitor having a backward tilt angle from −5 degrees (dashed box 222) to +15 degrees (dashed box 223) from vertical (dashed line 225), although another range such as plus or minus fifteen degrees or more is also configurable. The actual angle may be user configurable; for example, the user may set up the mechanism such that the arm has a stop when the monitor is at a backward tilt angle of +10 degrees to vertical.

In the example of FIG. 2, this user's workstation position is also set such that the bottom of display is approximately four inches off of the desk, with access to input devices, e.g., a keyboard and pointing device. If present, an auxiliary display is also likely visible in such a mode.

Figure 3:
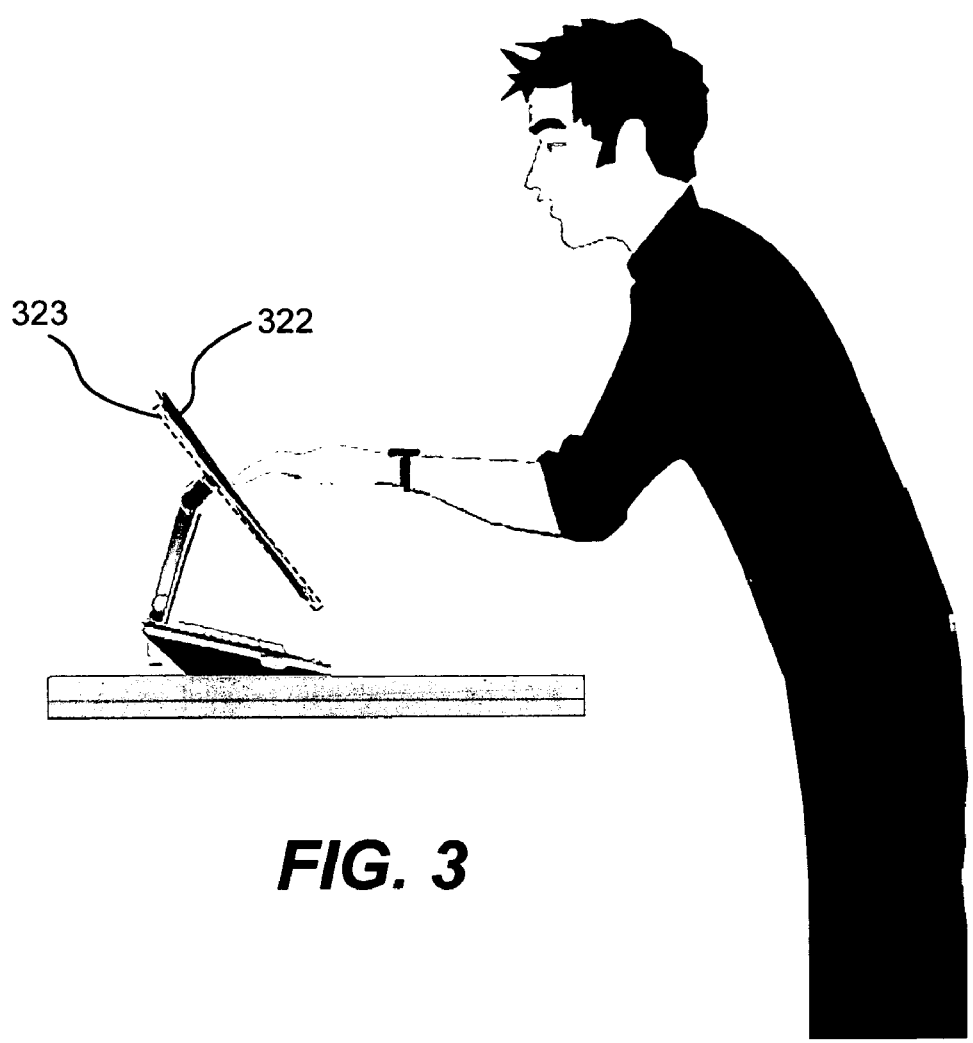
FIG. 3 is a representation of a walk-up mode in which a monitor is positioned to facilitate touch or pen input without requiring the user to sit down, or adjust the display for direct use.

FIG. 3 provides an example of the arm being hinged to provide a walk-up mode, such as in a position with the monitor 322 having a backward tilt angle of −45 degrees, which may be adjustable to an extent (e.g., dashed box 323). In the example of FIG. 3, the walk-up mode typically provides user interaction via a touch-screen interface. Such a mode is useful in environments where users need quick access to information, such as in a family's kitchen where users can leave messages for one another, quickly check the weather or traffic, look up phone numbers, and so forth.

In one implementation of the walk-up mode wherein the display is used primarily for touch-screen operation and/or distance viewing, one or more interactive mechanisms such as the transport (media) controls, power on/off button and auxiliary display information remain easily accessible. This is a result of the physical location provided by the design, namely at the front edge. The location of these mechanisms facilitates interaction with the computer system, including when the keyboard does not exist or is stored behind the display and is therefore not easily accessible.

Figure 4:
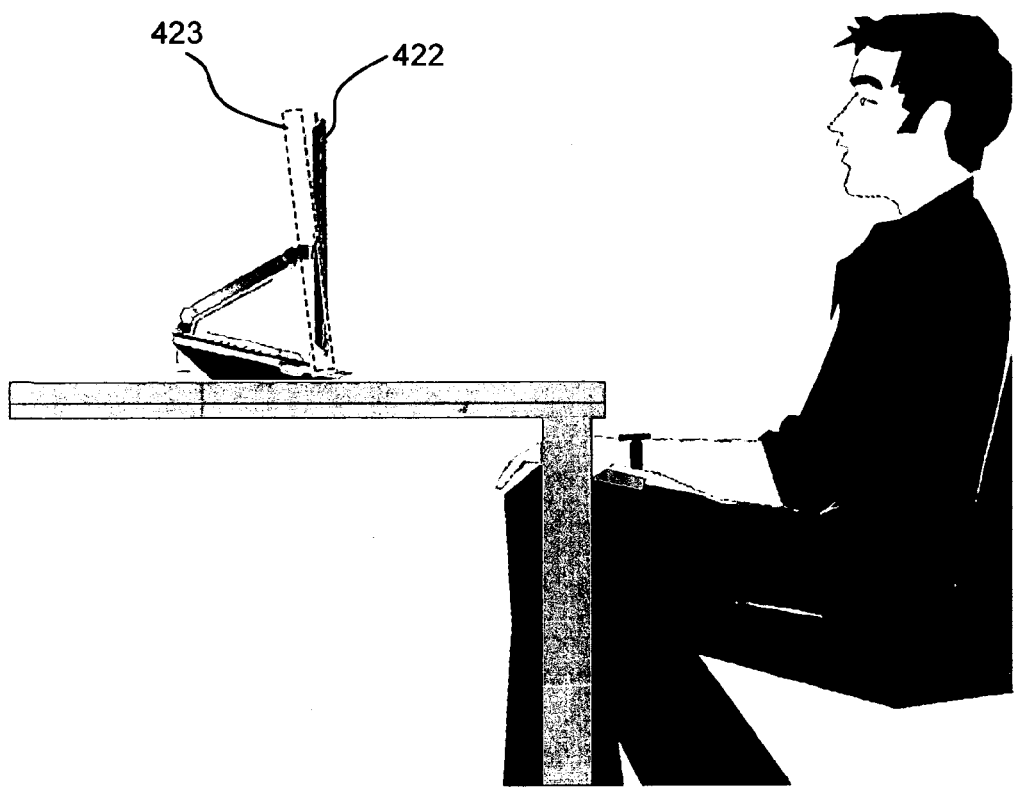
FIG. 4 is a representation of a media consumption mode in which a monitor is positioned to facilitate viewing while concealing input devices to an extent.

FIG. 4 provides an example of a media consumption mode, typically for viewing video where the bulk of user interaction is simply viewing. In FIG. 4, the arm is hinged such that the monitor screen 422 has been positioned forward, resulting in the input devices barely visible, if at all. The represented monitor screen 422 has zero vertical tilt, but the tilt may be adjustable within a reasonable range (dashed box 423). As described above with reference to FIG. 1, any necessary interaction, such as to get a movie started, may be accomplished in the modes of FIG. 2 or 3, or via remote control and/or touch-screen operation while in the media consumption mode exemplified in FIG. 4.

Figure 5:
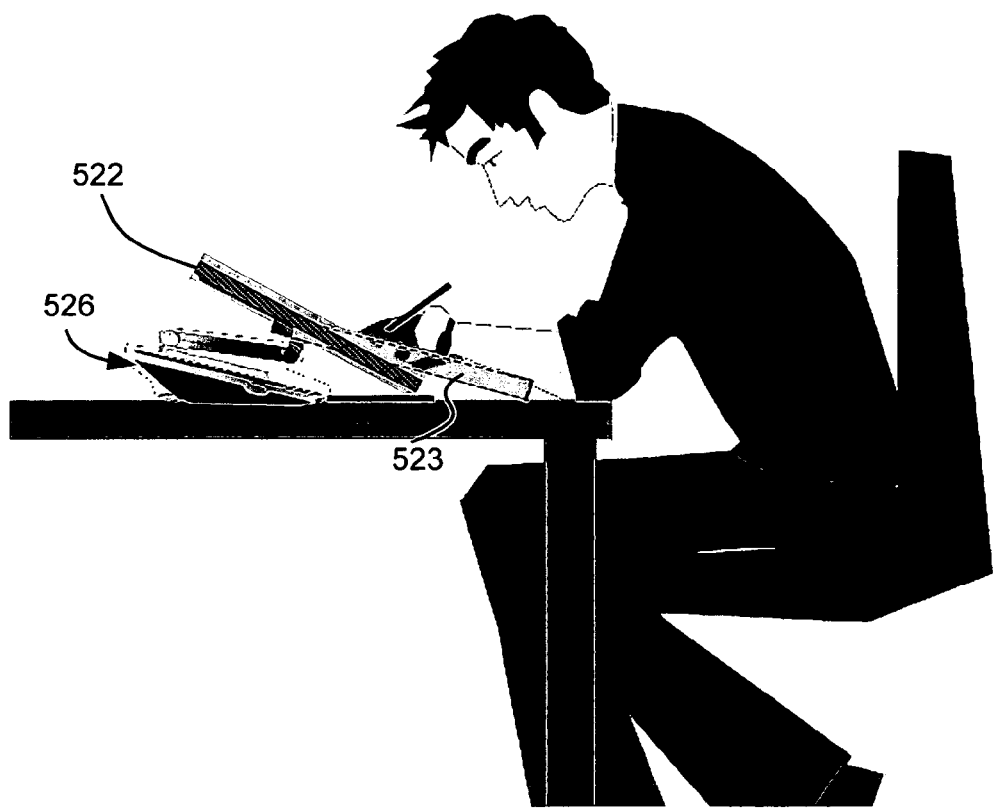
FIG. 5 is a representation of a walk-up mode in which a monitor is positioned to facilitate pen input.

FIG. 5 provides another example mode, e.g., referred to as a pen/stylus or tablet mode, in which a user interacts with the display monitor screen 522 using a pen or the like. In this mode, to facilitate writing, the tablet-type monitor screen is at an acute angle with its underlying table or desk, for example ten degrees (dashed box 523) to twenty degrees (box 22) from horizontal. For stability, any tilt is limited, as in this example the front edge of the display monitor is in contact with the underlying table or desk, and there is no substantial left-right rotation. If the base 526 provides an apparatus (e.g., a receptacle) for holding a pen/stylus for tablet input, as does the base 126 in the example of FIG. 1, easy access to the pen/stylus may be provided when in this mode.

Between the various modes the user may be able to set the display screen to any angle, such as counterbalanced by friction. Springs, lever-released latching mechanism, and other suitable mechanisms may help position the display screen as desired at the stops or at any location between the stops.

As can be seen, via a set of arms, one of which may be an articulating arm, multiple preset modes (which may be user configurable, at least to an extent) may be provided. The number of modes may depend on a particular type of monitor, e.g., a touch/pen sensitive monitor may have tablet and walk-up modes, while display-only monitors may not. Less than all modes may be provided, e.g., another system may include preset stops corresponding to workstation, media consumption and tablet modes, but not a preset stop corresponding to a walk-up mode. Still other modes are feasible, e.g., a cleaning/maintenance mode, a protective storage mode, and so forth. Depending on the type of mechanism, e.g., a motor-driven mechanism, a user may be able to set the modes and stop positions exactly as desired, or if not fully user-configurable, may choose to ignore certain stops that are not desired.

Figure 6A:
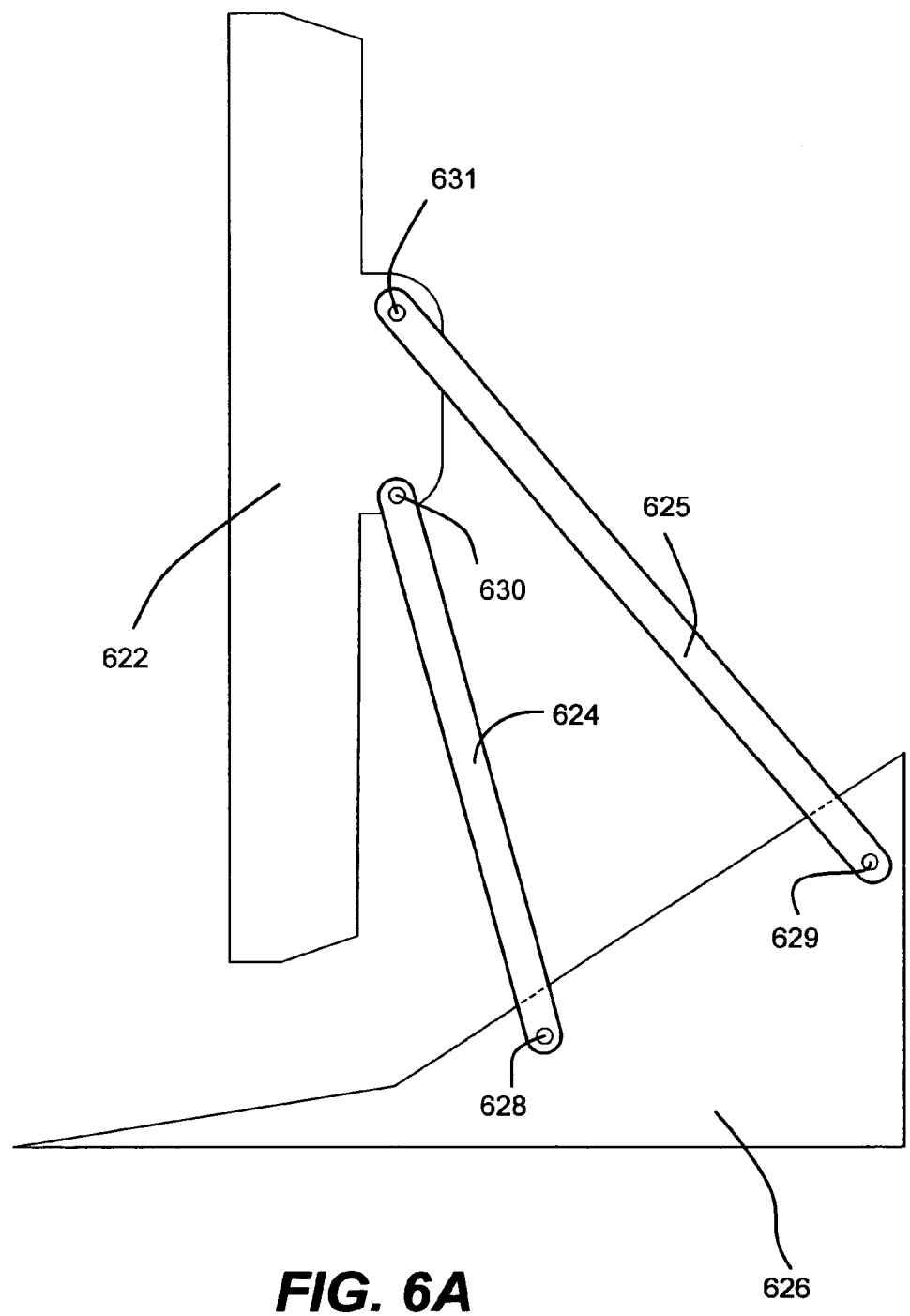
FIGS. 6A and 6B are side view representations of a four bar arm for positioning a monitor between a substantially upright position and a substantially flat (e.g., tablet mode) position, respectively.

Various examples of articulating arm implementations have been configured and are represented in FIGS. 6A-12C. For example, FIGS. 6A and 6B are side views of a four-bar implementation for positioning a monitor 622 (only two bars, or arms 624 and 625 are visible in FIGS. 6A and 6B due to the side view) between multiple positions. As can be seen, FIG. 6A represents a media consumption mode, and FIG. 6B a tablet mode. As will be apparent, a workstation mode (not shown) can be provided by moving the monitor backwards relative to the base.

Figure 6B:
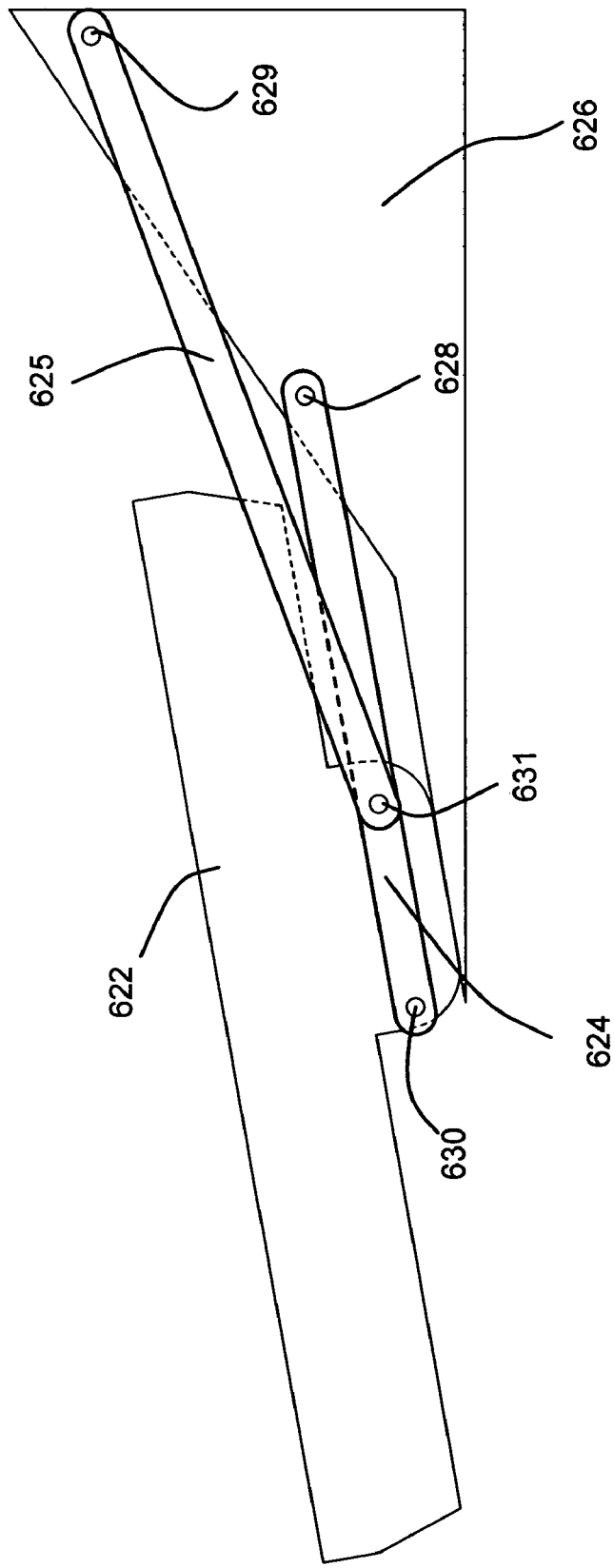

In general, in FIGS. 6A and 6B the bars 624 and 625 pivot on the base 626 via pivot points 628 and 629. The opposite end of the bars 624 and 625 are coupled to the monitor 622 (or a bracket or the like fixed to the monitor) at pivot points 630 and 631. The monitor 622 may be moved between these and other positions by manual or motor-driven operation. Various stopping mechanisms such as detents may be used to signify to the user, and to an extent hold the monitor 622, when the monitor 622 is in one of the preset modes.

Figure 7A:
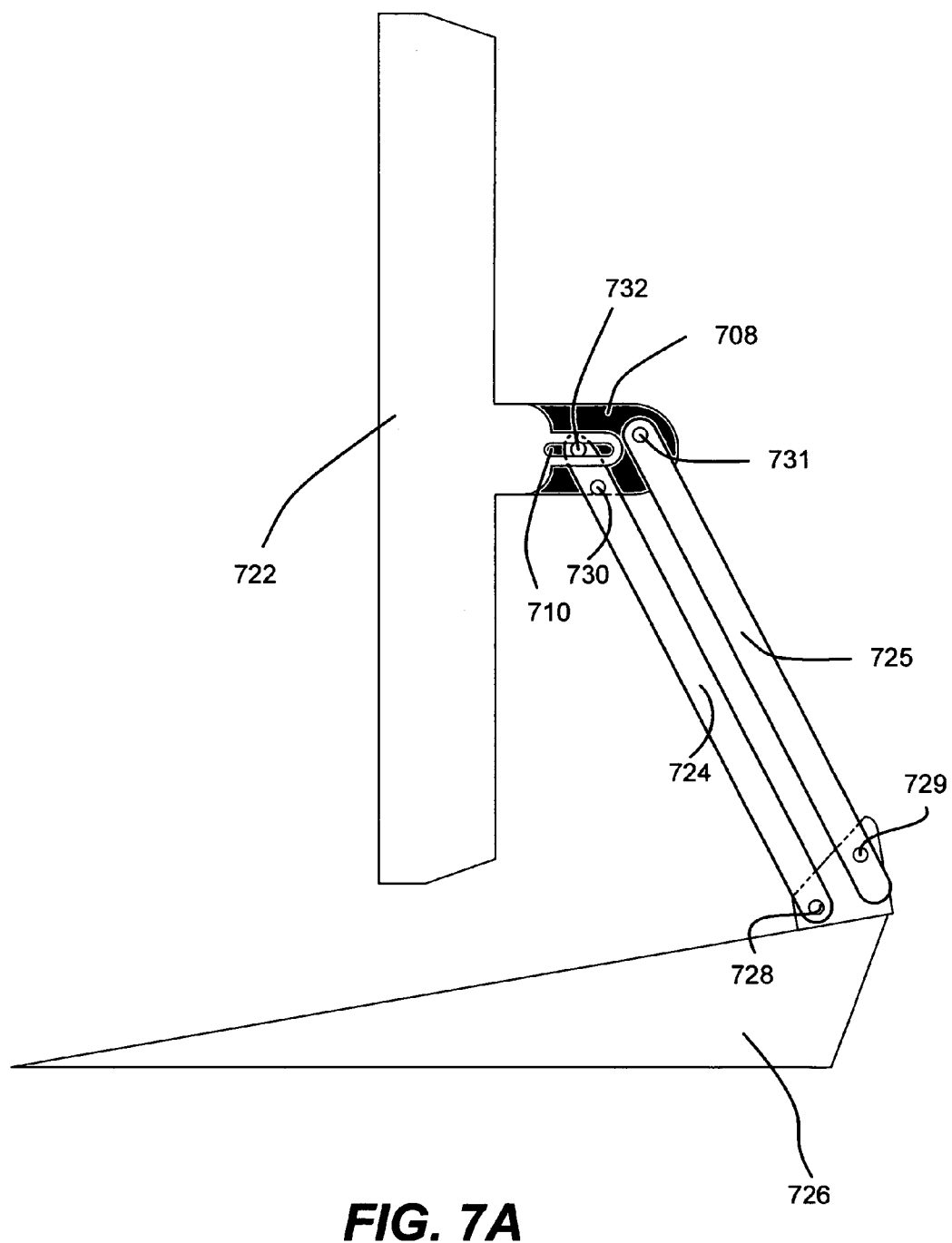
FIGS. 7A-7C are side view representations of a four bar arm with a slot for positioning a monitor between a substantially upright (e.g., media consumption) position to a forward-leaning (e.g., workstation) position and a substantially flat (e.g., tablet mode) position, respectively.
Figure 7B:
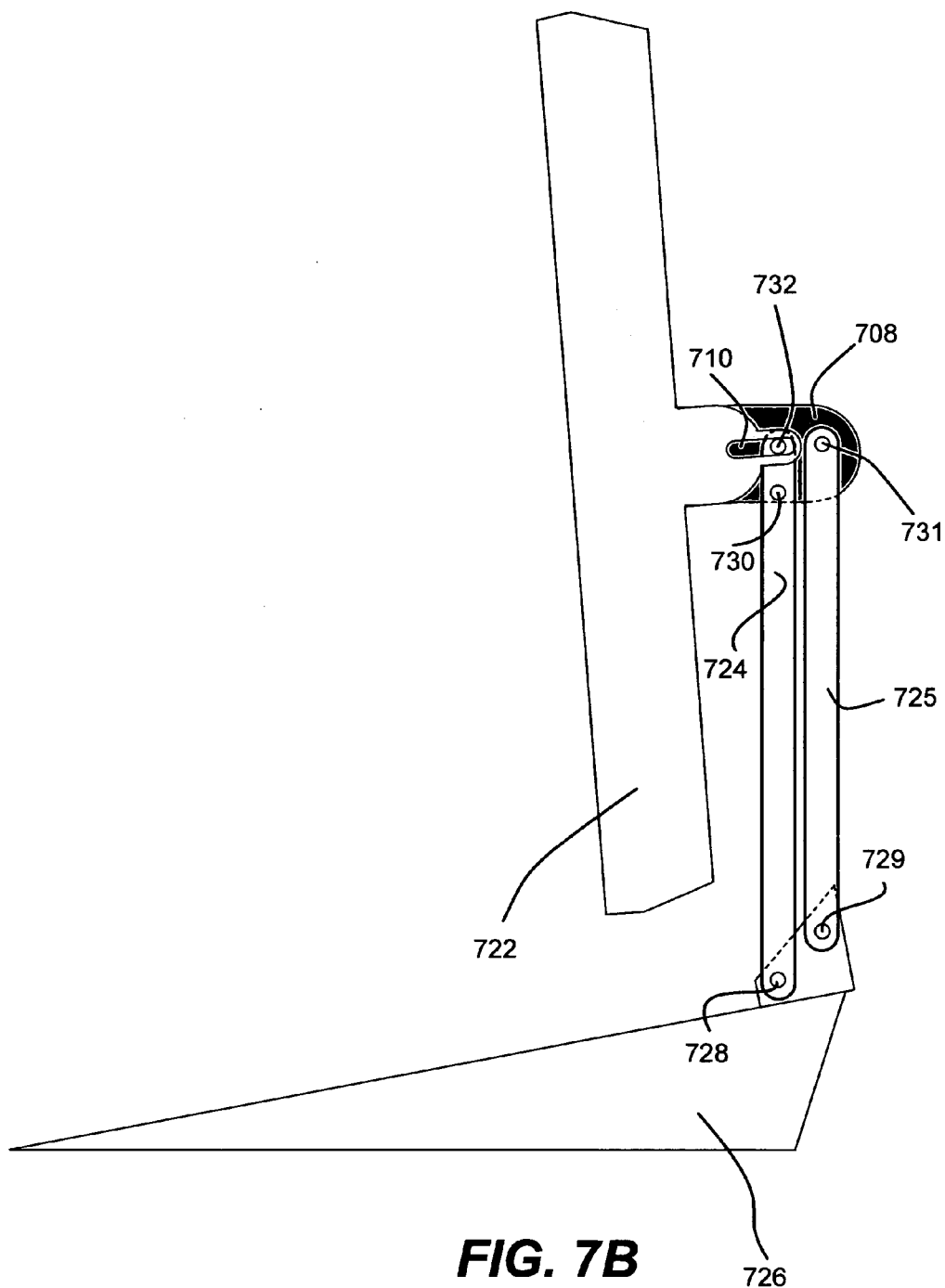
Figure 7C:
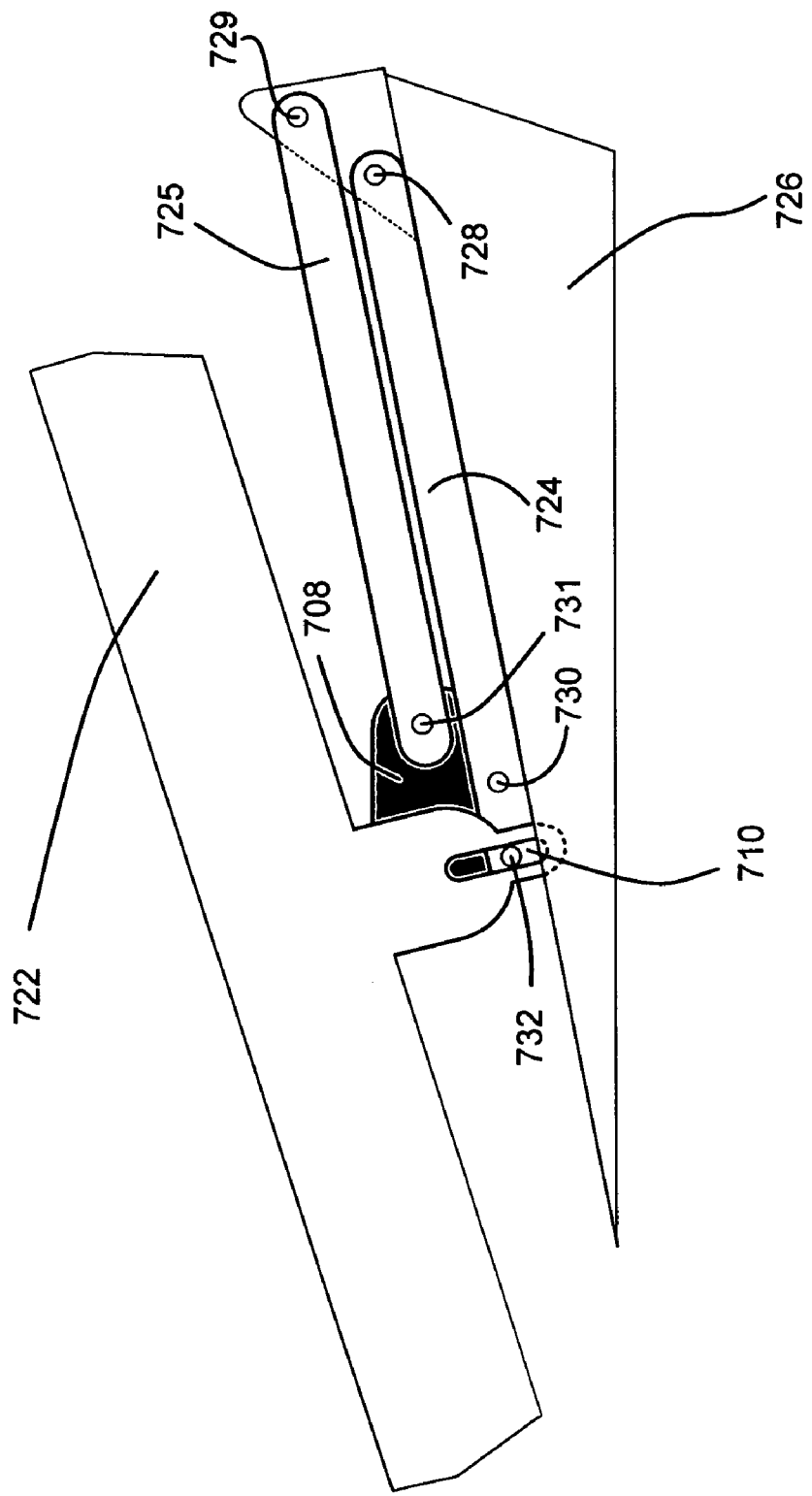

As another example, FIGS. 7A-7C are side views of a four-bar implementation with a cam 708 and slot 710 for positioning a monitor 722 between multiple positions. Again only two bars 724 and 725 are visible because of the side view. As can be seen, FIG. 7A represents a media consumption mode, FIG. 7B a workstation mode and FIG. 7C a tablet mode.

In general, as represented in FIGS. 7A-7C the bars 724 and 725 pivot on the base 726 via pivot points 728 and 729. The monitor 722 is coupled to the bars 724 and 725 via the cam 708. More particularly, the opposite end of the bars 724 and 725 are coupled to the cam 708 at pivot points 730, 731 and 732, and the distal end of the bar 724 moves within the slot 710.

As is readily apparent from FIGS. 7A-7C, the cam 708 rotates relative to the bars 724, 725 and the monitor 722. Again, any suitable mechanism may be used as a stop among the preset stopping positions that provide the different usage modes. Note that a walk-up mode is not shown, however it is readily apparent in FIGS. 7A-7C that the monitor 722 can be positioned at approximately a forty-five degree angle, with a stop present if a preset walk-up mode is desired.

Figure 8A:
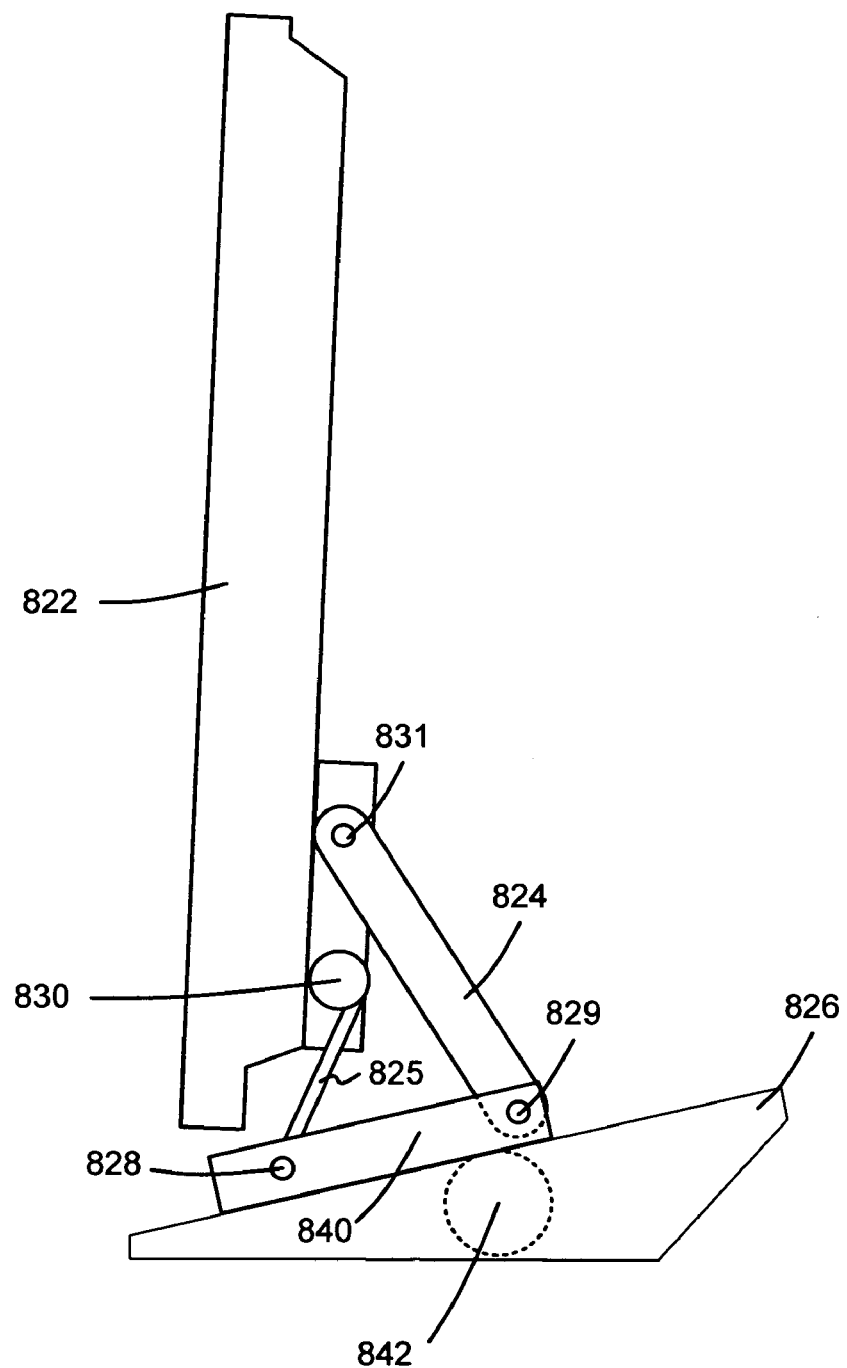
FIGS. 8A-8C are side view representations of a four bar arm with a sliding rack and pinion mechanism for positioning a monitor between a substantially forward (e.g., media consumption) position to a pushed-back (e.g., workstation) position and a substantially flat (e.g., tablet mode) position, respectively.
Figure 8B:
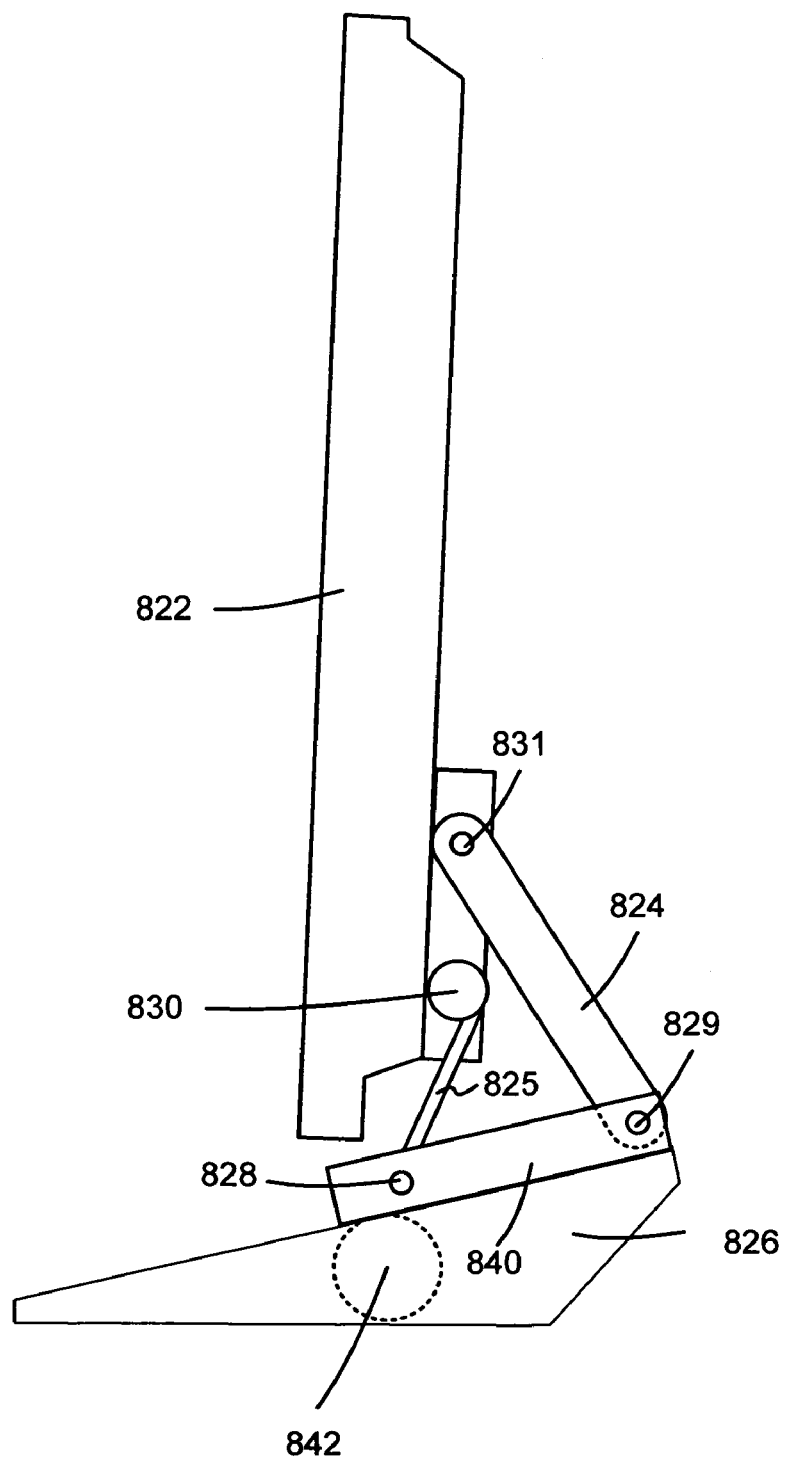
Figure 8C:
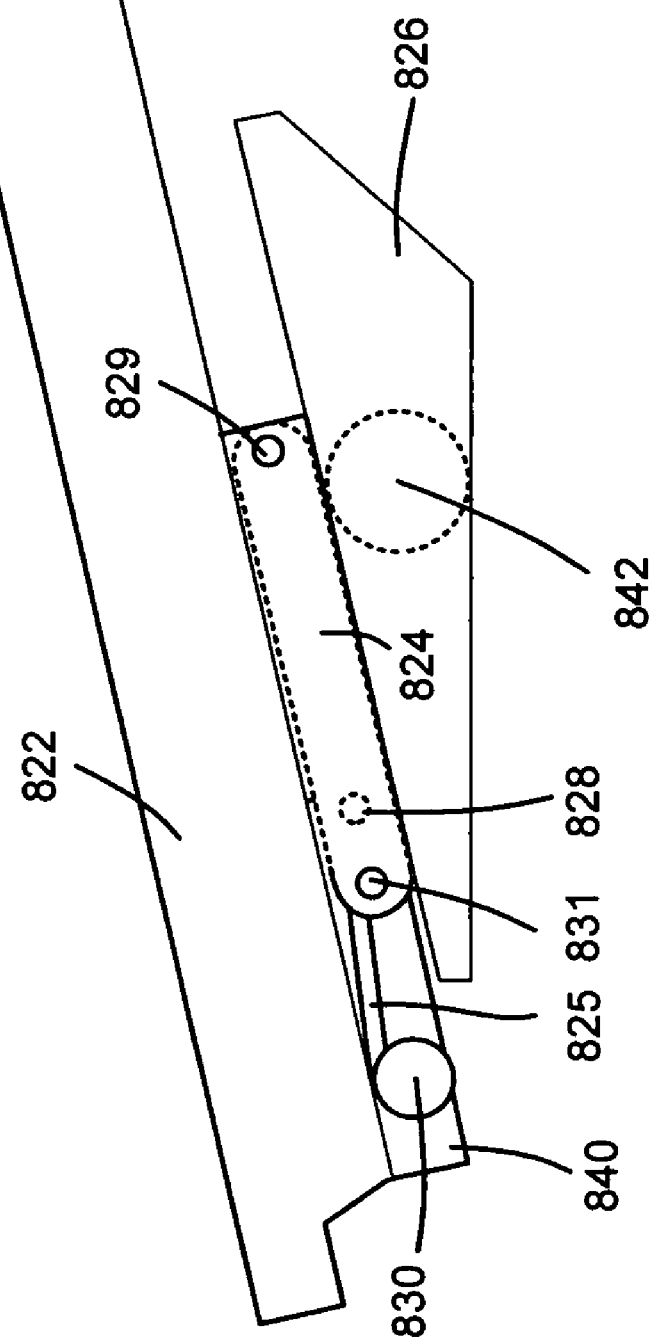

FIGS. 8A-8C represent an alternative arm mechanism that facilitates positioning a monitor 822 in multiple positions, including positions corresponding to preset modes. In this example implementation, there is a four bar arrangement with a linear slide, using a sliding rack 840 with a pinion 842 to provide smooth linear movement back and forward relative to a base 826. The bars 824 and 825 provide rotation, as they are coupled to the sliding rack 840 at pivot points 828 and 829, and are coupled to the monitor (directly or indirectly via a coupling such as a bracket or frame fixed to the monitor) at pivot points 830 and 831.

FIG. 8A generally corresponds to a media consumption mode, with the monitor slid forward on the pinion. Although not specifically shown in FIG. 8A, a more vertical tilt may be accomplished by rotating the top of the monitor forward. FIG. 8B corresponds to a workstation mode, with the monitor slid back on the pinion, thereby exposing more of the base to facilitate access to a keyboard, for example.

FIG. 8C corresponds to a tablet mode, and is accomplished by the four bars rotating to a position that is essentially parallel with the monitor and base. As apparent from FIG. 8C, the monitor (or coupling) may contact the underlying supporting surface to enhance stability.

Figure 9A:
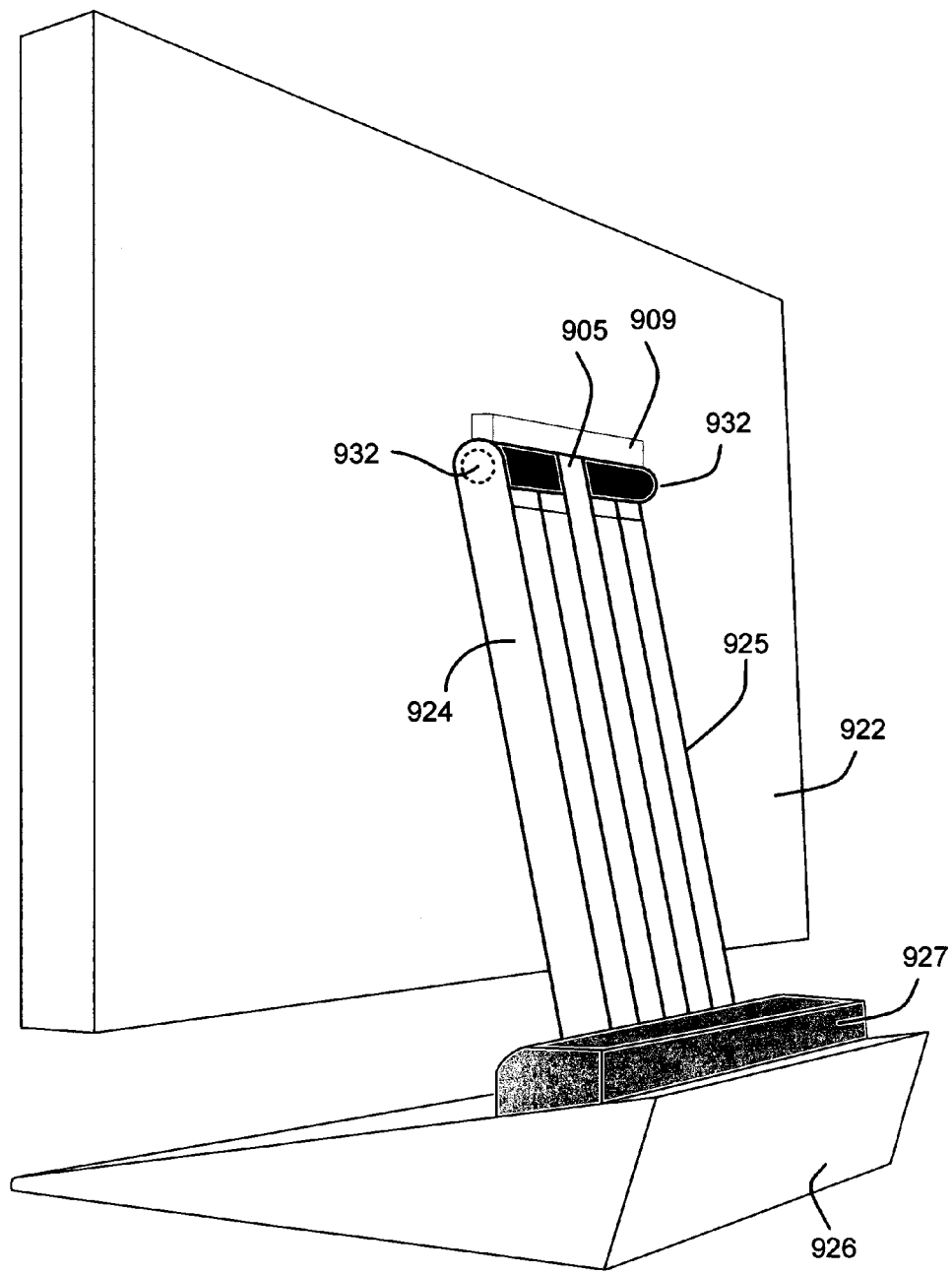
FIG. 9A is a perspective view of an arm based mechanism with a cable for positioning a monitor.
Figure 9B:
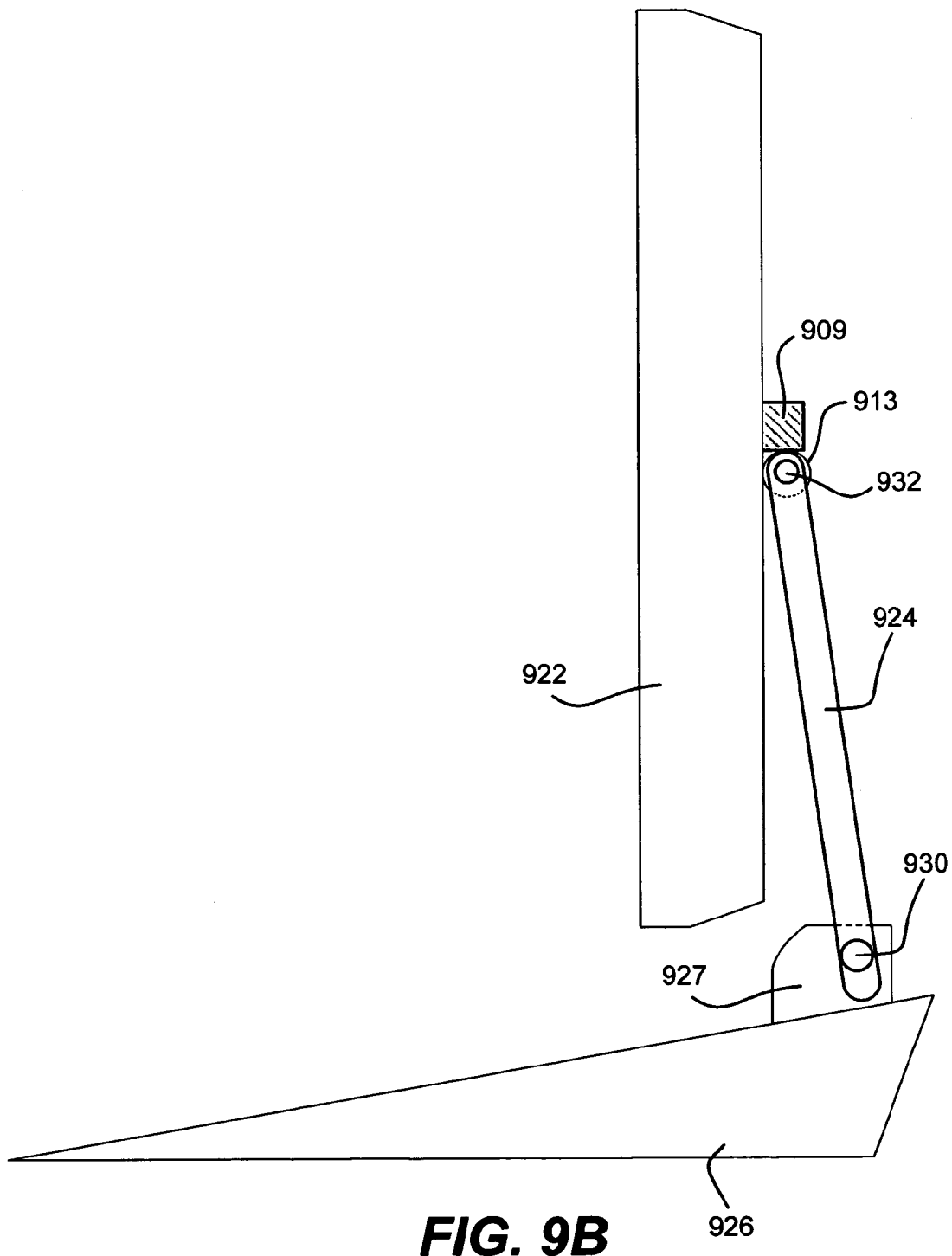

FIGS. 9A-9C show another alternative implementation, in which a rotating cable, belt or band 905, works with two arms 924 and 925 to achieve various positions for a monitor 926, including positions corresponding to preset modes. FIG. 9A provides a perspective view, while FIG. 9B demonstrates the workstation mode and FIG. 9C demonstrates the tablet view.

The cable, belt or band 905 may be motorized, or may otherwise provide a guide/friction that helps the monitor maintain a desired positioned between modes or other positions. In FIGS. 9B and 9C, the arm 924 (only one is visible due to the side view) is shown coupled to a mounting 927 on the base 926 at pivot point 930. The opposite end of the arm 925 is coupled to the monitor 922 via a bracket 909 and cylinder 913 or the like to provide rotation at pivot point 932.

Figure 10A:
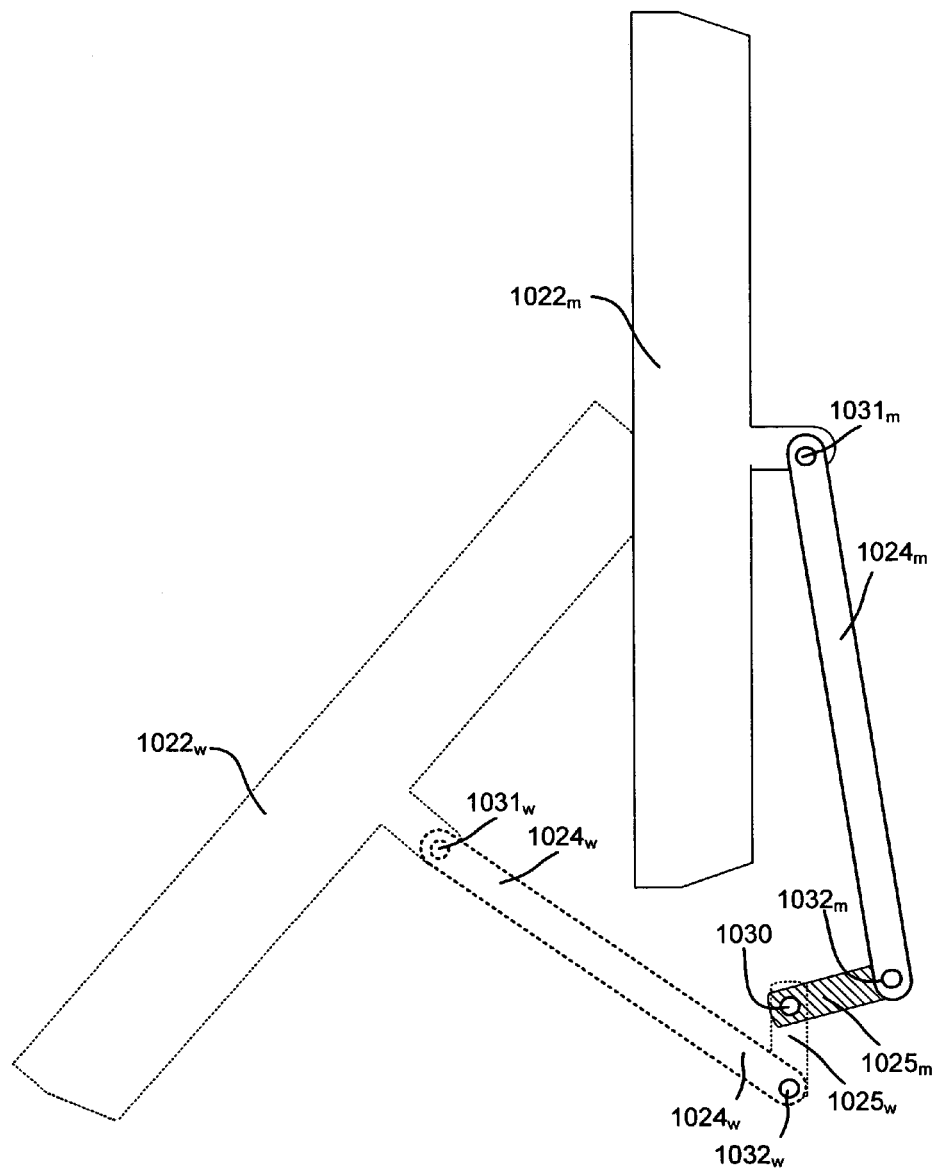
FIGS. 10A and 10B are side view representations of a monitor using an articulating arm mechanism for positioning a monitor between a substantially upright (e.g., workstation or media consumption) position to a leaned-back (e.g., walk-up) position and a substantially flat (e.g., tablet mode) position.
Figure 10B:
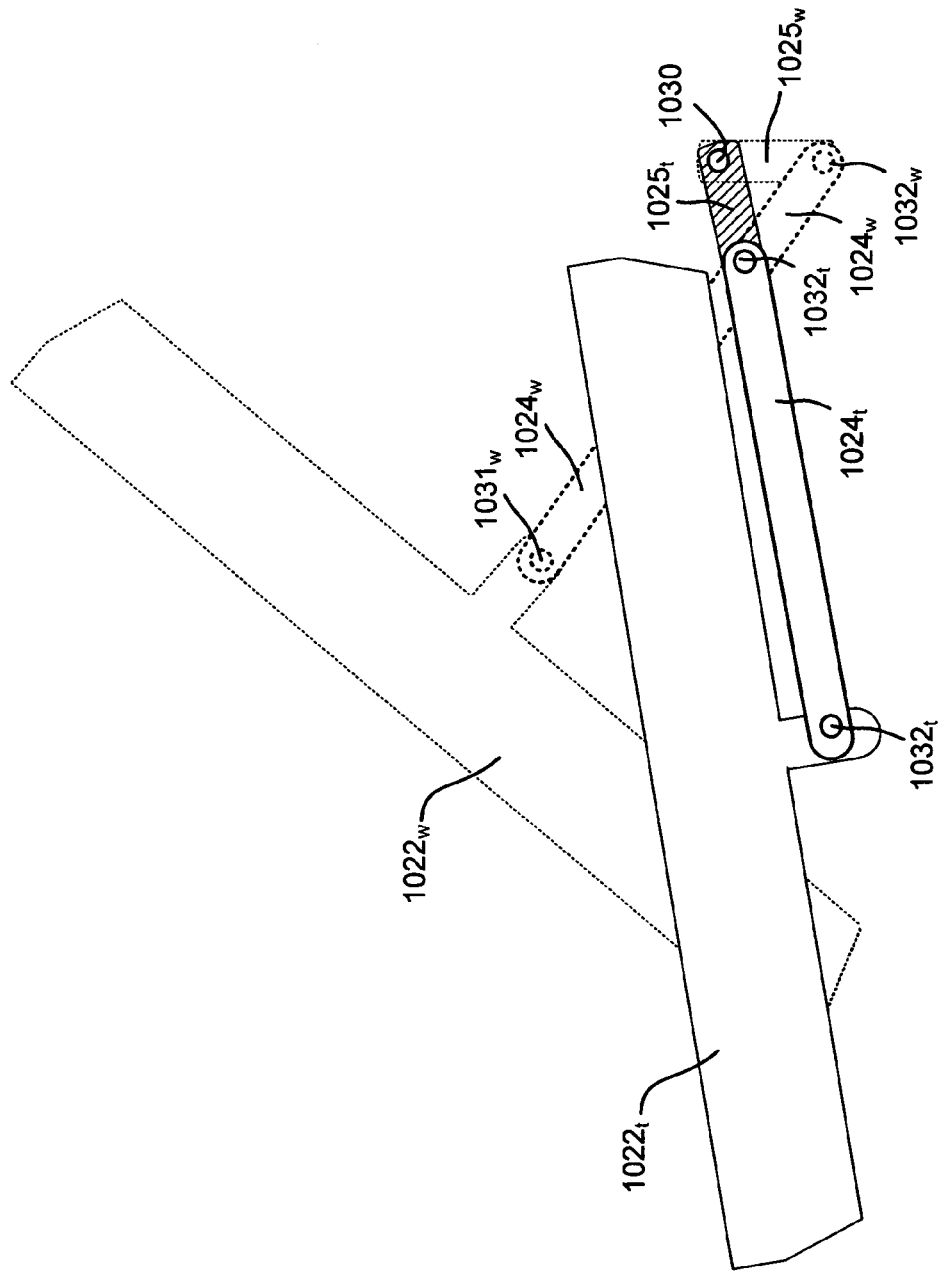

FIG. 10A shows another alternative example implementation, in which a monitor transitions between a substantially upright mode (e.g., a media consumption mode shown in solid figures) and a walk-up mode (shown in dashed representations). FIG. 10B the monitor transitioning between walk-up mode (shown in dashed representations) and a tablet mode (shown in solid figures). In FIGS. 10A and 10B, each component is labeled with a subscript indicative of the mode, e.g., the arm 1024 is labeled $1024_m$ for the media consumption mode, $1024_w$ for the walk-up mode, and $1024_t$ for the tablet mode. The only exception is the pivot point 1030, which remains fixed regardless of the monitor's mode and corresponding position. For purposes of simplicity, when referring to a component independent of a particular position, each component may be referred to herein without its subscript.

In FIGS. 10A and 10B, only one set of arms 1024 and 1025 is visible. The longer arm 1024 is coupled to the monitor 1022 via pivot point 1031. The shorter arm 1025 is coupled to the longer arm at pivot point 1032, and coupled to a base or other support surface at the pivot point 1030. As can be seen in FIGS. 10A and 10B, the arms 1024 and 1025 rotate relative to one another, relative to the monitor and relative to the fixed pivot point 1030.

The upright mode in FIG. 10A is shown with long arm $1024_m$ being rotated to a somewhat vertical position, with the short arm $1025_m$ extending rearward from the fixed point 1030 at roughly a right angle to the long arm $1024_m$. The walk-up mode is shown in FIGS. 10A and 10B with the long arm $1024_w$ being rotated to a somewhat perpendicular position relative to the monitor $1022_w$ and the short arm $1025_w$ descending generally vertically from the fixed pivot point 1030.

The tablet mode in FIG. 10B is shown as being achieved by having the long and short arms $1024_t$ and $1025_t$, respectively, extending from the fixed pivot point 1030 somewhat parallel to the monitor $1022_t$. Rotation may be manual or motor driven.

Figure 11A:
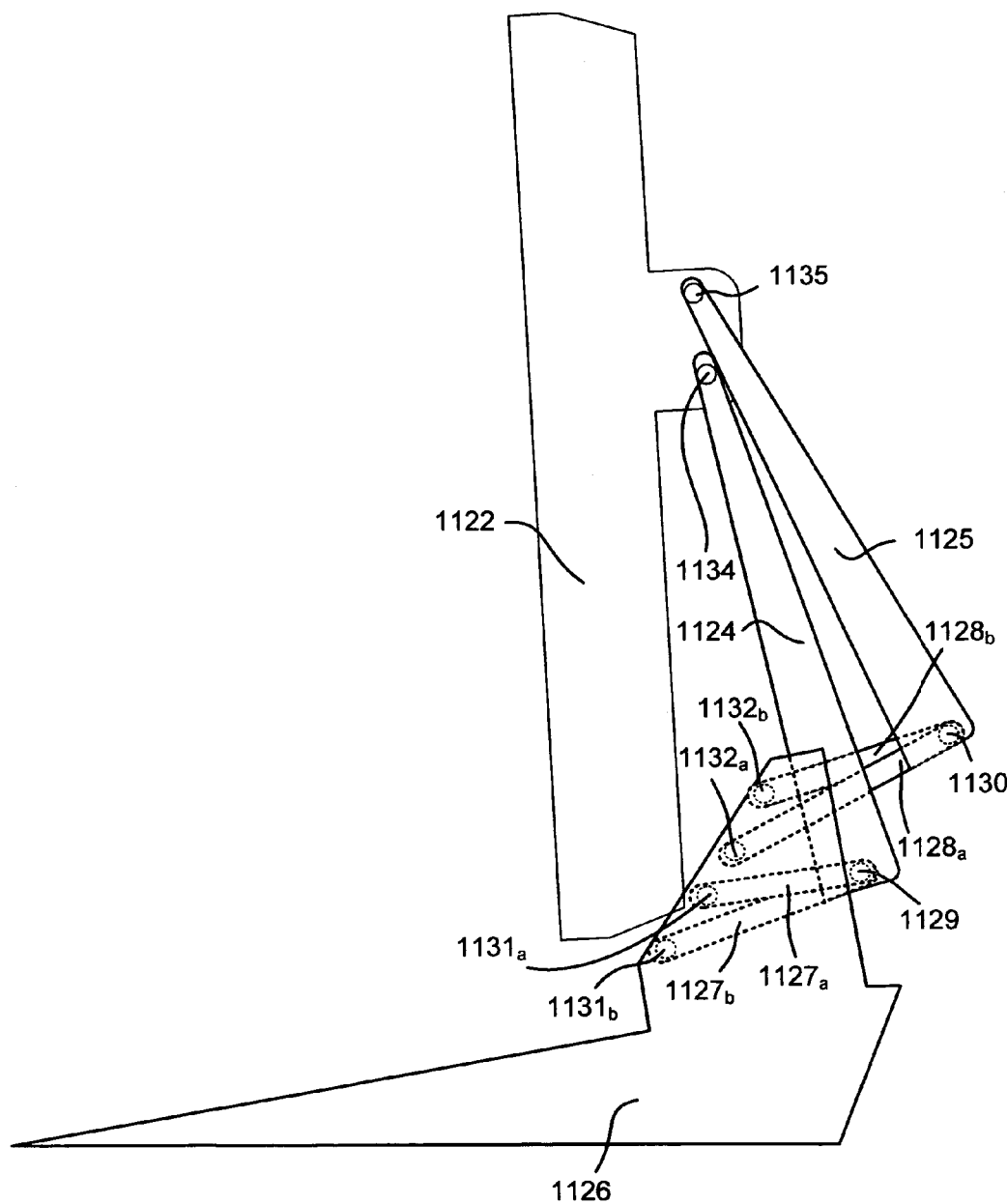
FIGS. 11A and 11B are side view representations of a monitor using an articulating arm mechanism for positioning a monitor between a substantially upright (e.g., workstation or media consumption) position to a substantially flat (e.g., tablet mode) position, respectively.
Figure 11B:
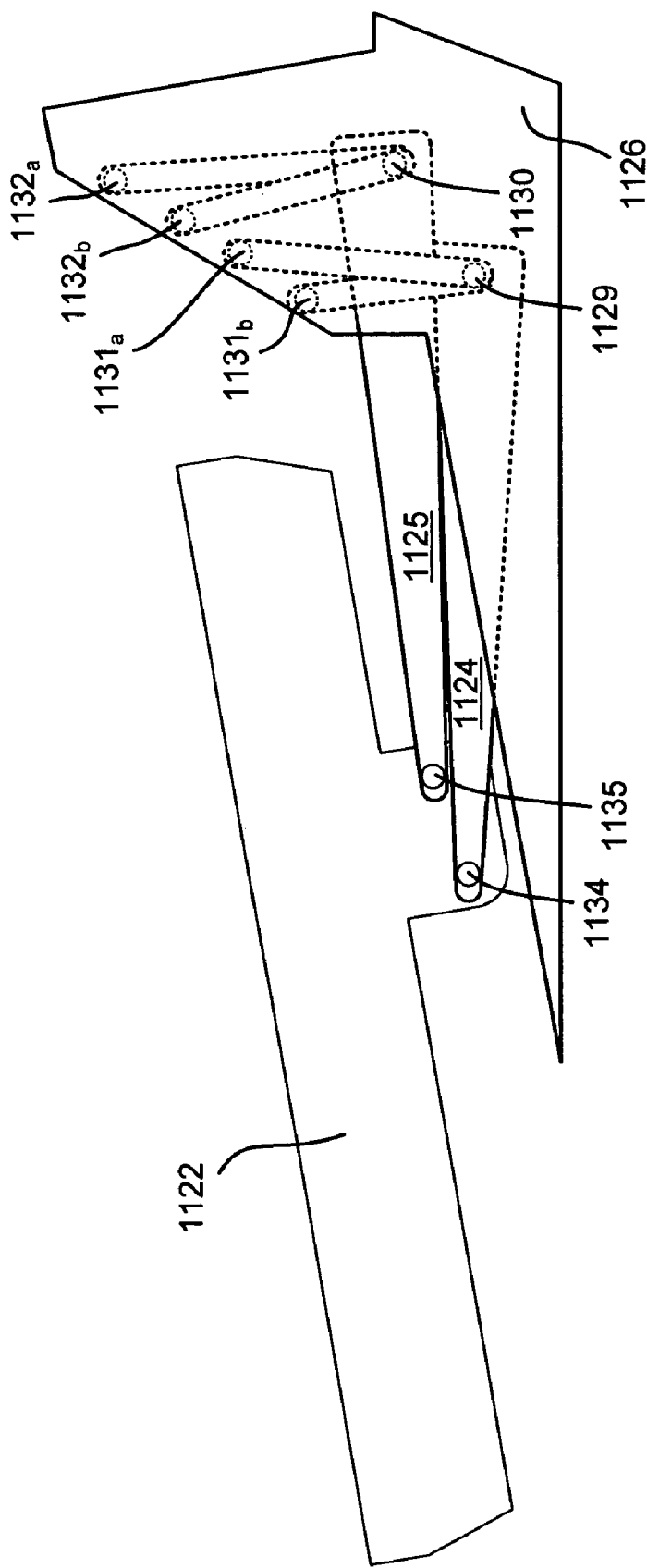

FIGS. 11A and 11B show a somewhat similar implementation, with two long arms 1124 and 1125 per side and each arm coupled to a base 1126 via two short arms 1127a, 1127b, 1128a and 1128b. The short arms 1127a, 1127b, 1128a and 1128b couple to the long arms at pivot points 1129 and 1130, and are coupled for rotation to the base 1126 at fixed pivot points 1131a, 1131b, 1132a and 1132b. The long arms couple to the monitor 1122 at points 1134 and 1135.

As can be seen, the monitor transition from the workstation mode of FIG. 11A to the tablet mode of FIG. 11B, with other positions in between, which may correspond to preset modes. To this end, the long arms 1124 and 1125 and short arms 1127a, 1127b, 1128a and 1128b pivot such that the bottom of the monitor 1122 rotates forwards and downwards relative to the base 1126 and the base's fixed pivot points 1131*a*, 1131*b*, 1132*a* and 1132*b*.

Figure 12A:
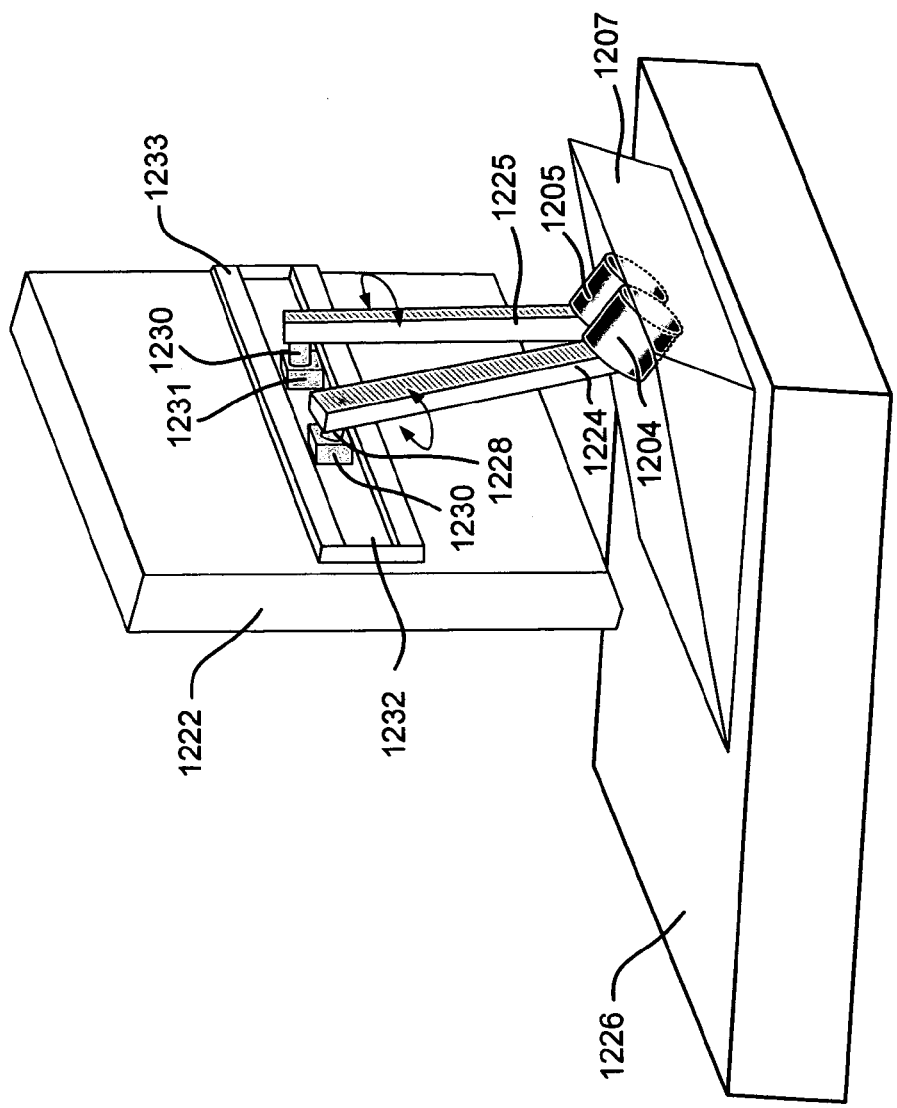
FIG. 12A is a perspective view of an arm based mechanism with twin arms that move within a slot and turn for positioning a monitor.
Figure 12B:
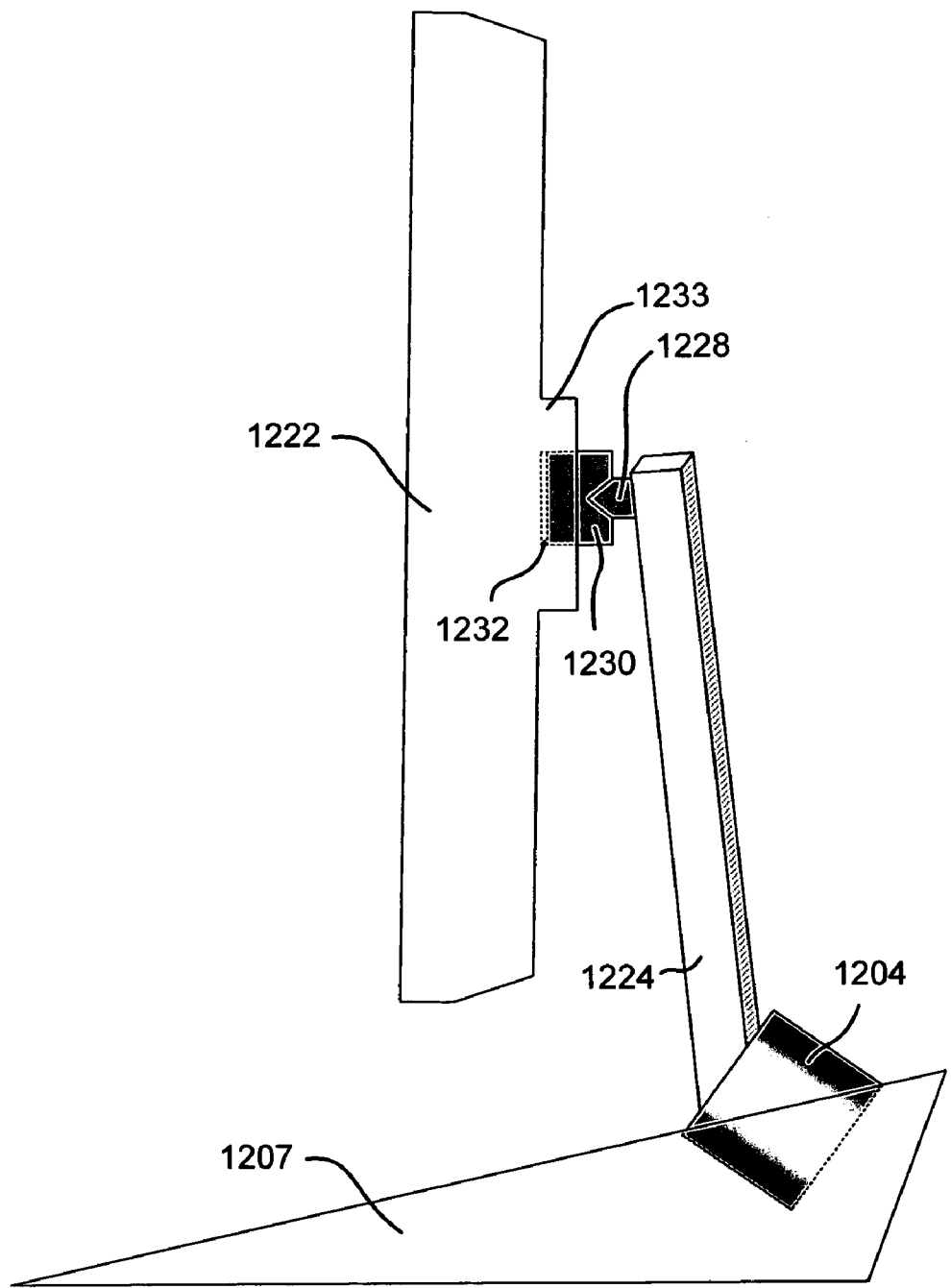
FIGS. 12B and 12C are side view representations of a monitor using the mechanism of FIG. 12A for positioning a monitor between a substantially upright position and a substantially flat (e.g., tablet mode) position, respectively.
Figure 12C:
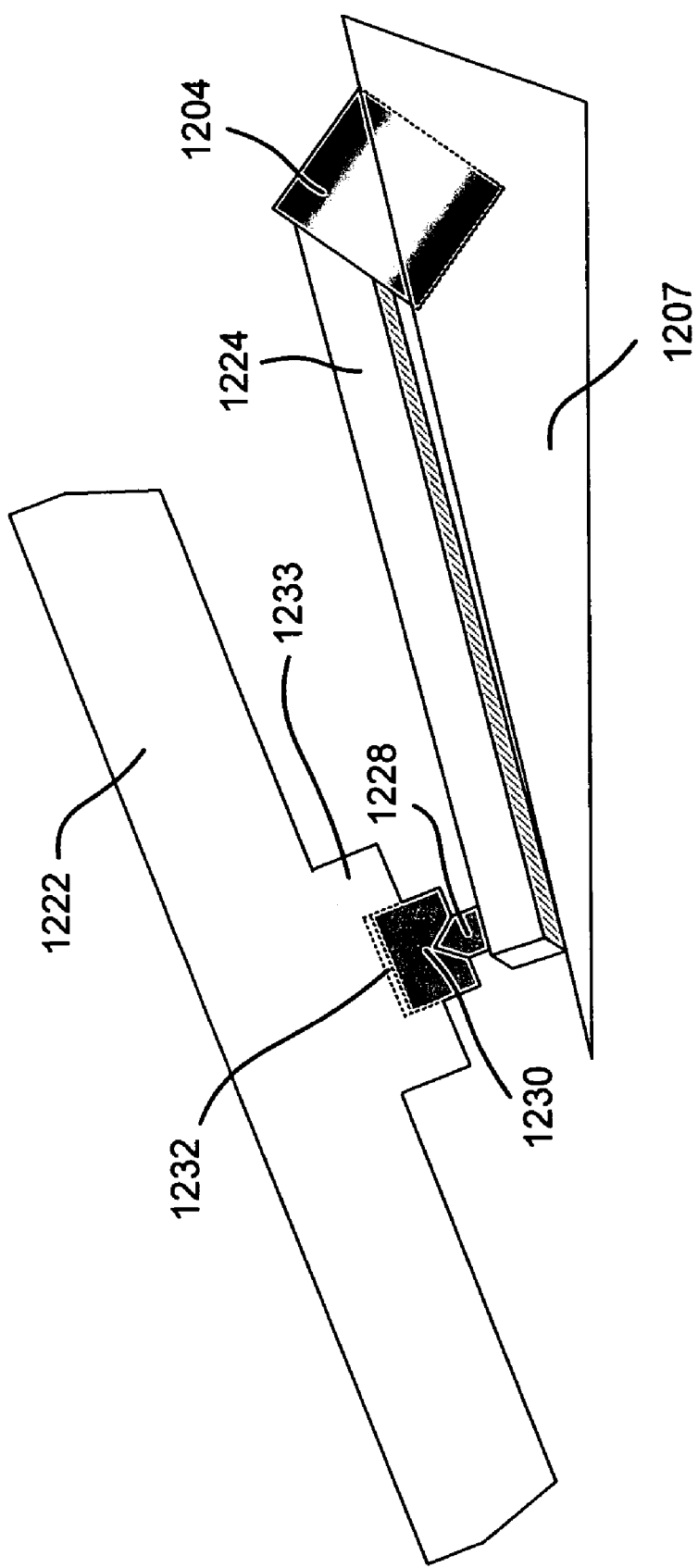

Yet another example implementation is represented in FIGS. 12A-12C. In this implementation, two arms 1224 and 1225 rotate inwardly and outwardly, and turn/spin (as represented by the double-headed arrows around the arms) relative to a base 1226 at the arm's distal ends. To this end, rotors 1204 and 1205, which may be motorized, respectively couple the arms 1224 and 1225 to a ramped part 1207 of the base 1226. The rotors may be motorized.

The opposite ends of the arms 1224 and 1225 are fixed to cylinders 1228 and 1229, which in turn pivotally couple to guides 1230 and 1231 that laterally slide along a slot 1232 of a frame 1233 mounted to the back of the monitor 1222.

As seen in FIGS. 12A-12C, the rotation and turning of the arms 1224 and 1225 slide the guides 1230 and 1231 in the slot 1232, causing the monitor to rotate. In these examples, the rotation is from the monitor being in a substantially upright position (FIG. 12B) to a mostly flattened (e.g., tablet mode) position (FIG. 12C). Note that the turning of the arms may be seen in FIGS. 12B and 12C by the shaded side of the arm 1224 turning over relative to the rotor 1204.

As can be seen from the above examples, there are numerous ways to implement an arm or set of arms to position a monitor to correspond to desirable usage modes.

Figure 13:
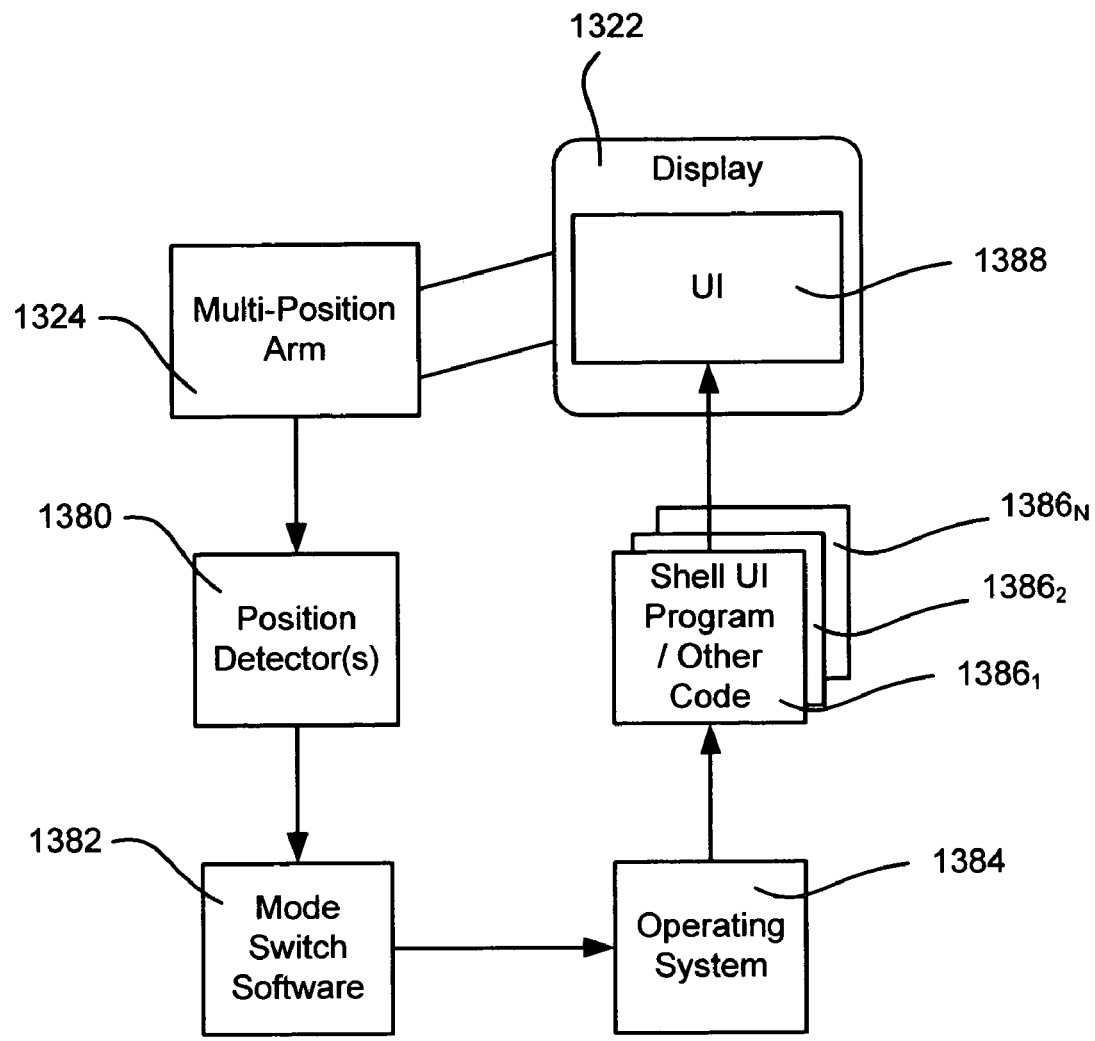
FIG. 13 is a block diagram representing how a computer system may change operating modes based on a current position of a display (e.g., corresponding to a current interaction mode) coupled to a multiple position arm.

In addition to providing the various positions corresponding to interaction modes, the computer providing the content to display can change software operating modes to match the corresponding monitor position. By way of example, FIG. 13 shows a multiple-position arm 1324 coupled to a position detection means 1380, such as one or more switches, a counter (such as motor rotations), an optical sensor or sensors and/or essentially any equivalent mechanism or mechanisms that can report a signal indicative of the current position (at least once movement has stopped) to a computer system. Note that the exact position need not be known, e.g., the display monitor may be known to be positioned between two preset stops, thereby providing information from which software can be loaded, even though the exact location between those stops may not be detectable in a given system.

The position detector means 1380 is coupled (e.g., via a hardware to software interface) to mode switch software 1382 running on the computer system. In general, the mode switch software 1382 comprises policy or the like, which may be user configurable preference data, as to what shell user interface and/or other software should be operational in each position, including positions between preset modes. The mode switch software 1382, which may be any program such as an application and/or operating system component, reports the position-based decision to the operating system 1384, which in turn loads a corresponding shell user interface and/or other program or programs (e.g., 1386$_1$) as necessary to configure the computer system user interface display 1388 and running programs to match the current mode. Some delay may be provided to avoid loading and changing software until it is likely that a user has settled on a particular position and/or interaction mode rather than transitioning between modes.

By way of example, when the arm is positioned such that the display monitor is in the media consumption mode, media player software may be loaded and automatically executed. In the tablet mode, tablet operating system components such as including handwriting recognition software may be loaded and automatically executed. In the walk-up mode, a touch-screen shell program configured to provide convenient access to walk-up types of information (e.g., weather, messages, the internet and so forth) may be loaded. In the workstation mode, typical shortcuts and other information used for working/productivity or other computer usage (e.g., gaming) may be displayed.

Note that any of the software modes may be per user or group, e.g., the workstation mode may display different user accounts from which to select, optionally enter a password and so forth so that multiple users can share a computer. Moreover, the various modes that are available to each user can match that particular user's preference, and there is no need to provide an option to switch user accounts when the same user has transitioned from one position to another.

The system may persist personal settings for the display; e.g., once the system identifies the user, or a change in the user, the system may automatically switch to that user's default display position. This can happen automatically, e.g., through biometric sensors, or other sensing technologies such as face recognition and/or proximity sensors. Such settings also may be application specific. For example, if the system detects the user is launching a television or other media application program, the system may automatically switch to the user's media consumption mode, e.g., a vertical flat position. The positions can also be manually changed, such as triggered from a button on the display or keyboard.

The system may include animation software or provide other output describing the positioning mechanism. This software can automatically run during position switching, or can be manually triggered.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising a computer and a monitor, the system further comprising:
    a mechanism that couples the monitor to a base, the mechanism including at least one arm having a set of at least two stops, the arm moveable between positions corresponding to each of the stops, and each stop corresponding to an operating mode within a set of modes, the set of modes comprising each of a workstation mode, a media consumption mode, a walk-up mode, a tablet mode, a maintenance mode, and a storage mode;
    one or more biometric sensors for identifying a user of the system;
    a position detection means for detecting the position of the monitor, the position detection means being coupled via a hardware to software interface to mode switch software on the computer, the mode switch software comprising a policy and user-configurable preference data indicating which shell interface and which software is to be operational in each detected position;
    the mode switch software being enabled to determine from the detected position of the monitor and the user-configurable preference data, a shell interface and software which should be operable;
    the mode switch software further being enabled to report the position-based determination of the shell interface and software to an operating system of the computer; and
    the system being enabled to switch to a particular mode based upon the identity of a user and an application being launched or run by the identified user.

2. The system of claim 1 further comprising means for adjusting the monitor an additional amount relative to at least one position corresponding to a stop.

3. The system of claim 1 wherein the workstation mode facilitates access to at least one input device.

4. The system of claim 1 wherein the workstation mode corresponds to a range of tilt angles between negative fifteen degrees vertical to positive fifteen degrees vertical.

5. The system of claim 1 wherein the media consumption mode corresponds to a mode optimized for media consumption.

6. The system of claim 1 wherein the media consumption mode conceals at least part of an input device and at least one control that are unnecessary for media viewing.

7. The system of claim 1 wherein the walk-up mode corresponds to a range of tilt angles between negative sixty degrees vertical to negative thirty degrees vertical and facilitates touch and pen input to the computer.

8. The system of claim 1 wherein the tablet mode facilitates pen input through the monitor.

9. The system of claim 8 wherein the tablet mode corresponds to a position in which the bottom of the monitor is stabilized by a fixed surface.

10. The system of claim 1 wherein the stops comprise each of visible, audible and tactile feedback.

11. The system of claim 1 wherein the mechanism that couples the monitor to the base includes a pair of arms that each extend from the base and couple to the monitor for sliding in a lateral direction relative to the monitor, and rotate relative to the monitor.

12. The system of claim 1 wherein the mechanism comprises an articulating arm having at least two fixed members that are pivotally coupled to one another.

13. The system of claim 1 wherein the mechanism comprises a four bar arm mechanism having two pairs of bars apart from one another.

14. The system of claim 1 wherein the mechanism that couples the monitor to the base includes a sliding rack and pinion mechanism.

15. The system of claim 1 further comprising software change means for changing software corresponding to the operating mode.

16. In a computing environment including a computer system and monitor, a method comprising:
    identifying a user of the system through a biometric sensor;
    based upon the identity of the user, switching to a default display position for the identified user;
    detecting a current position of a monitor coupled to a movable arm;
    reporting a signal indicative of the current position of the monitor to the computer system;
    mode-switch software determining from the current position of the monitor and from user-configurable preference data, a shell interface and software which should be operable;
    the mode-switch software reporting the determined shell interface and software to an operating system;
    the operating system providing a delay to avoid loading and changing software during a transition between positions of the monitor; and
    the operating system loading the shell interface and software, the shell interface and software corresponding to an operating mode associated with the current position.

17. The method of claim 16 wherein the current position corresponds to an operating mode within a set of modes, the set of modes comprising each of a workstation mode, a media consumption mode, a walk-up mode, a tablet mode, a maintenance mode, and a storage mode, and wherein loading the shell interface and software comprises changing a user interface based on the operating mode.

* * * * *